(12) United States Patent
Cusano et al.

(10) Patent No.: US 10,501,152 B2
(45) Date of Patent: Dec. 10, 2019

(54) STRUCTURAL MONITORING SYSTEM OF THE HULL OF A SHIP INTEGRATED WITH A NAVIGATION DECISION SUPPORT SYSTEM

(71) Applicant: CENTRO PER GLI STUDI DI TECNICA NAVALE—CETENA S.p.A., Genoa (IT)

(72) Inventors: Giovanni Cusano, Genoa (IT); Mauro Garbarino, Genoa (IT); Stefano Qualich, Genoa (IT)

(73) Assignee: CENTRO PER GLI STUDI DI TECNICA NAVALE-CETENA S.p.A., Genoa (IT)

( * ) Notice: Subject to any disclaimer, the term of this patent is extended or adjusted under 35 U.S.C. 154(b) by 128 days.

(21) Appl. No.: 15/540,503

(22) PCT Filed: Dec. 29, 2015

(86) PCT No.: PCT/IB2015/060025
§ 371 (c)(1),
(2) Date: Jun. 28, 2017

(87) PCT Pub. No.: WO2016/108183
PCT Pub. Date: Jul. 7, 2016

(65) Prior Publication Data
US 2017/0369127 A1     Dec. 28, 2017

(30) Foreign Application Priority Data

Dec. 30, 2014  (IT) .............................. MI2014A2277

(51) Int. Cl.
*B63B 9/00*  (2006.01)
*B63B 49/00*  (2006.01)
(Continued)

(52) U.S. Cl.
CPC .............. *B63B 9/003* (2013.01); *B63B 9/001* (2013.01); *B63B 49/00* (2013.01); *G01S 13/956* (2013.01); *B63J 2099/008* (2013.01); *Y02A 90/18* (2018.01)

(58) Field of Classification Search
CPC ......... B63B 9/003; B63B 9/001; B63B 49/00; G01S 13/956; Y02A 90/18; B63J 2099/008
See application file for complete search history.

(56) References Cited

U.S. PATENT DOCUMENTS

| | | | | |
|---|---|---|---|---|
| 6,263,297 B1* | 7/2001 | Sikora | ...................... | G01G 3/16 702/175 |
| 6,996,493 B1* | 2/2006 | Sikora | ................. | G06F 17/5009 702/138 |
| 8,643,509 B1* | 2/2014 | Chen | ........................ | B63B 9/08 114/74 R |

FOREIGN PATENT DOCUMENTS

| | | | | |
|---|---|---|---|---|
| EP | 2 167 916 B1 | 5/2011 | | |
| KR | 2013-0135721 A | 12/2013 | | |
| WO | WO-2008152613 A3 * | 8/2009 | ............. | G01S 13/88 |

OTHER PUBLICATIONS

Cusano, G. et al., "Sh.A.M.An. (SHip Advanced Monitoring and ANalysis) system: principles and algorithm used for data processing)", Cetena Report No. 11222, Genova, 23 pages (2012).

(Continued)

*Primary Examiner* — Rodney A Butler
(74) *Attorney, Agent, or Firm* — Merchant & Gould P.C.

(57) ABSTRACT

A system assists the driving of a ship and is configured to estimate the structural loads of the ship due to the direct wave excitation, and structural loads of the ship due to the whipping effect caused by the wave slamming. The system includes at least one reference sensor adapted to provide an indication of a motion or stress magnitude at a predetermined point of the ship structure, and is further configured to calculate an estimate of the magnitude at the predetermined point in the ship structure, compare the indication of magnitude with the estimate of the magnitude so as to determine an offset value, and correct the estimates of the structural loads and/or the estimate of the magnitude on the basis of the offset value.

6 Claims, 13 Drawing Sheets

(51) Int. Cl.
  *G01S 13/95*  (2006.01)
  *B63J 99/00*  (2009.01)

(56) References Cited

OTHER PUBLICATIONS

International Search Report and Written Opinion of the International Searching Authority for corresponding International Patent Application No. PCT/IB2015/060025 dated May 2, 2016, 13 pages.
Adegeest, L., "Response Based Weather-Routing and Operation Planning of Heavy Transport Vessels", Marine Heavy Transport & Lift, 9 pages (2008).
Journee, J. "Review of the 1985 Full-Scale Calm Water Performance Tests Onboard m.v. Mighty Servant 3", Report 1361, Internet Citation, 1-112 (2003).
"Octopus-Onboard The new generation decision-making support system to optimize ship performance in waves", Amarcon, 15 pages (2006).
Rathje, H. et al., "Concept and Implementation of an Innovative Shipboard Routing Assistance System", International Conference on Design and Operation of Container Ships, 8 pages (2003).

\* cited by examiner

STRUCTURAL MONITORING SYSTEM OF THE HULL OF A SHIP INTEGRATED WITH A NAVIGATION DECISION SUPPORT SYSTEM

This application is a National Stage Application of PCT/IB2015/060025, filed 29 Dec. 2015, which claims benefit of Serial No. MI2014A002277, filed 30 Dec. 2014 in Italy and which applications are incorporated herein by reference. To the extent appropriate, a claim of priority is made to each of the above disclosed applications.

TECHNICAL FIELD

The present invention relates, in general, to the shipbuilding and navigation field; more specifically, the invention relates to a system for assisting the driving of a ship.

BACKGROUND ART

The traditional structural monitoring systems consist of sensors that record the state of the global and local structural stresses of the ship's structure, the pressures affecting the hull and the rigid body motions of the platform.

It is sufficient to use a limited number of sensors, the relative acquisition hardware and software conforming with the requirements of the register to obtain the additional class notation on the structural monitoring (notation MON-HULL+S of the RINA, MON HULL of the BV, HM of ABS, HMON of DNV, HSS of the Lloyd's Register).

For example, as regards the notation MON-HULL of the RINA, the following is sufficient:

1 long base strain gauge positioned on the centerline for measuring the flexural strain of the hull girder;

1 vertical accelerometer placed at the bow;

1 bi-directional inclinometer and 3 accelerometers (longitudinal, transverse, vertical) positioned at the center of gravity of the ship for the measurement of the rigid body motions.

In this case, the acquisition system consists of a panel placed at midship and containing the power supply/acquisition electronics of the sensors and an acquisition PC interfaced with the ship automation (for the acquisition of signals and for sending alarms/warnings) and with any other onboard equipment, with relative screen.

Of course, a larger set of sensors than that strictly required by the regulations allows having a more detailed picture of the state of the ship platform and of the structure, but with greater overall dimensions of the system due to the number of sensors, cables and hardware installed on board.

A more complete system consists for example of the following sensors:

6 long base strain gauges, placed at ¼, ½ and ¾ of the ship length, on the keel and below the main deck;

1 vertical accelerometer placed at the bow;

1 vertical accelerometer placed at the stern;

1 bi-directional inclinometer and 3 accelerometers (longitudinal, transverse, vertical) positioned at the center of gravity of the ship for the measurement of the rigid body motions;

4 linear strain gauges placed at critical points of the ship structure;

2 triaxial strain gauges placed at critical points of the ship structure;

1 pressure probe placed on the bottom at the bow.

In this case, the acquisition system consists of three panels—located at the stern, at midship and at the bow, respectively, so as to minimize the distance between them and the strain gauge sensors and thereby maximize the accuracy of measurement-containing the power supply/acquisition electronics of the sensors and an acquisition PC interfaced with the ship automation (for the acquisition of signals and for sending alarms/warnings) and with any other onboard equipment, with relative screen.

The use of a wave radar for the measurement of the directional sea state (wave height, direction and period) and the interaction with the onboard automation to acquire the operational parameters of the ship (propulsive state, power at the axles, propeller revolutions, activation/deactivation of equipment, etc.) and to send the alarm/warning signals regarding the structure to it allow—on the one hand—exhaustively recording the operational status of the ship so as to correlate the state of stress measured by the sensors and—on the other hand—providing the officers with an immediate feedback on the possible exceeding of the warning thresholds set concerning the structural safety of the ship.

The use of a wave radar for the measurement of the directional sea state requires the use of the onboard X-band radar or, if the use thereof is not allowed, the installation of a dedicated X-band radar, a possible signal amplification unit and a power supply unit; moreover, a control PC and a unit for digitizing the signal from the radar are required.

The presence of a calculation and computation module of the fatigue cycles in the management software of the structural monitoring system allows evaluating, through appropriate off-line post-processing methodologies, the past and residual fatigue life of the structural details gauged on board.

The "active guidance" systems (to which the system described in EP 2167916 belongs) are based on calculation tables derived from the FEM/CFD models of the ship, i.e. on the response operators of the ship motions, of the global structural stresses of the ship and of the resistance to progress.

Depending on the data relating to the sea condition and to the current route/speed (acquired by the onboard equipment), expected (acquired by weather forecast systems) or hypothetical (entered manually) conditions, these systems can provide information about the current or expected maximum ship motions in a specified period of time, about the efficiency of the ship and relative subsystems ("Safe Operating Envelope" diagram), about the route economy in the short term and the overall structural integrity (bending moment and vertical shear in the sections). The best performance of these systems is when they are interfaced to a wave radar to determine the directional sea state, preferably with vision toward the bow.

The response operators of the ship are obtained from hydrodynamic/structural numerical models of the ship which consider the hull shapes, weights, inertia, sectional characteristics, added mass thereof: the results are obtained by taking into account the static contribution in still water and the dynamic wave and whipping contributions generated by slamming.

These models therefore consider the overall response of the structure in terms of rigid body motions and bending of the hull girder and evaluate the ship efficiency in the current/expected sea weather conditions based on the current/expected maximum motions, global strains or combinations thereof in the short term.

The high reliability achieved today by the hydrodynamic/structural numerical calculation models and the progress in the forecasting and simulation techniques of the more complex hydroelastic effects (slamming/whipping) allow obtaining an excellent matching between the calculated values and the actual values: experimental campaigns carried out on tank and real models have allowed validating these approaches and making them usable in the reality of the operational management of the ship.

The onboard installation of an "active guidance system requires:

- calculation of the response operators of the ship motions and of the global structural stresses of the ship concerned: rigid body motions, flexural response with wave and slamming/whipping contribution, resistance to progress, etc.;
- customization of the software based on the ship concerned and the desired diagrams;
- interfacing with the onboard automation for the ship position, route, speed signals, wind speed and direction, etc.;
- provision of PC and screens to install the software;
- provision of a radar wave system for measuring the directional sea state (X-band radar, signal amplification unit, power unit, control PC and unit for the digitalization of the signal from the radar);
- possible interfacing with weather forecast systems.

The "Safe Operating Envelopes" available on board are therefore updated in real time on the basis of the current sea weather (sea/wind) and operating conditions and are interactive, allowing the officers to enter forecast or attempt operational and/or sea weather data: the new diagram corresponding, for example, to a change in the route or speed or sea weather conditions expected within the next hours or days is overlapped by the software to the diagram of the current conditions, providing a clear and immediate visual comparison of the effects of the operational changes envisaged.

The diagrams are determined on the basis of the envelope of the limit conditions that the ship or its subsystems can withstand and may include, for example:

- polar diagram for the stability of the ship;
- polar diagram for takeoff/landing of helicopters (and aircraft), the so-called "helicopter/ship interface";
- polar diagram for boat hauling down/recovery;
- polar diagram referred to the structural integrity of the haul girder in terms of bending moment and shearing strength at the centerline or in other sections;
- polar diagram referred to the route economy in the short term, based on the evaluation of the added resistance due to the sea and the wind. Some wave radar systems are able to evaluate also the current in the navigation area, the effect of which may be included in the analysis of the route economy.

The active guidance system thus composed bases its results only on the response operators calculated from the hydrodynamic/structural models and has small overall dimensions on board (requires no sensor).

SUMMARY OF THE INVENTION

It is a purpose of the present invention to provide a technology that can extend the capabilities of the structural monitoring systems and the active guidance systems.

To this purpose, the object of the invention is a system for assisting the driving of a ship, including:

- navigation detection means adapted to provide an indication of the motion of the ship;
- environmental detection means adapted to provide an indication of the sea wave motion; and
- at least one processing unit, configured to execute in real time, during the motion of the ship, the following steps:
  - determining rigid body ship motions due to the direct wave excitation based on the indication of the ship motion and on the indication of the sea wave motion,
  - estimating structural loads of the ship due to the direct wave excitation, said estimation being calculated on the basis of said determination of the rigid body ship motions,
  - evaluating and providing an indication of the wave slamming on the ship,
  - estimating the structural loads of the ship due to the whipping effect caused by the wave slamming, said estimate being calculated on the basis of said indication of wave slamming on the ship, wherein said estimates of structural loads are based on 3D finite element models, which reproduce the dynamic behaviors of the ship structure,
  - calculating a combination of the estimated structural loads, and
  - graphically and/or numerically presenting the combination of the estimated structural loads;

wherein said system includes at least one reference sensor adapted to provide an indication of a motion or stress magnitude at a predetermined point of the ship structure, said at least one processing unit being further configured to execute in real time, during the motion of the ship, the following steps:

- calculating an estimate of said magnitude at the predetermined point of the ship structure, said calculation including:
  - calculating a first estimate contribution due to the direct wave excitation, said first estimate contribution being calculated on the basis of said determination of the rigid body ship motions,
  - calculating a second estimate contribution due to the whipping effect caused by the wave slamming, said second estimate contribution being calculated on the basis of said indication of wave slamming on the ship, wherein said estimate contributions are based on 3D finite element models, which reproduce dynamic behaviors of an area of the ship structure at said predetermined point,
  - calculating a combination of said first and second estimate contribution,
- comparing said indication of magnitude, provided by the reference sensor during the motion of the ship, with the estimate of said magnitude so as to determine an offset value; and
- correcting the estimates of the structural loads and/or the estimate of said magnitude on the basis of said offset value.

According to a preferred embodiment of the invention, said at least one processing unit is further configured for:

- calculating an estimate of said magnitude at at least a second predetermined point of the ship structure, without sensors, said calculation including:
  - calculating a first estimate contribution due to the direct wave excitation, said first estimate contribution being calculated on the basis of said determination of the rigid body ship motions,
  - calculating a second estimate contribution due to the whipping effect caused by the wave slamming, said second estimate contribution being calculated on the basis of said indication of wave slamming on the ship, wherein said estimate contributions are based on 3D finite element models, which reproduce dynamic behaviors of an area of the ship structure at said second predetermined point, calculating a combination of said first and second estimate contribution;

graphically and/or numerically presenting the combination of said first and second estimate contribution.

In particular, said at least one processing unit is further configured for:

correcting the estimate of said magnitude at the second predetermined point without sensors based on the offset value determined by the comparison between said indication of magnitude provided by the reference sensor with the estimate of said magnitude at the first predetermined point provided with the reference sensor.

In particular, it is preferred that:

said step of calculating an estimate of said magnitude at the second predetermined point without sensors includes calculating an expected maximum value and minimum value of said magnitude of the second predetermined point at each acquisition instant within an exposure time interval ($T_0$-$T_{exp}$, $T_0$) before a reference instant ($T_0$), and calculating, at the reference instant $T_0$, the maximum, minimum, average and RMS value of the expected maximum values and minimum values in the exposure time interval ($T_0$-$T_{exp}$, $T_0$) for the second predetermined point;

said step of calculating an estimate of said magnitude at the first predetermined point provided with reference sensor includes calculating an expected maximum value and minimum value of said magnitude of the first predetermined point at each acquisition instant within the time interval ($T_0$-$T_{exp}$, $T_0$) before the reference instant ($T_0$), and calculating, at the reference instant $T_0$, the maximum, minimum, average and RMS value of the expected maximum values and minimum values in the exposure time interval ($T_0$-$T_{exp}$, $T_0$) for the first predetermined point;

said step of comparing said indication of magnitude with the estimate of said magnitude includes extracting a maximum, minimum, average and RMS measurement value from recorded data of measurements provided by the reference sensor in the time interval ($T_0$-$T_{exp}$, $T_0$), and determining deviation values as the difference between the maximum, minimum, average and RMS measurement value and the expected maximum, minimum, average and RMS value of said magnitude in the first predetermined point in the time interval ($T_0$-$T_{exp}$, $T_0$).

The system according to the invention has the characteristic of combining the capabilities and the advantages of the structural monitoring systems and of the "active guidance" navigation support systems.

In a system of this type, the minimum number of sensors required by the register to obtain the additional class notation relative to the structural monitoring (notation MON-HULL+S of the RINA or equivalent notation of other Registers) is combined with the integration in the structural monitoring software of the response operators of motions and global stresses of the hull girder (as in the active guidance systems) and of local stresses of the structure, the latter obtained from detailed FEM models of structural points of interest. Therefore, integrating an "active guidance" system in a structural monitoring system is equivalent to incorporating some "virtual" sensors in the latter for the evaluation of stresses in ungauged areas of the ship.

The presence of data measured by real sensors further allows the calibration/scaling of polar diagrams: for ship motions, the data provided by the bidirectional inclinometer and by the accelerometer triad placed at the center of gravity of the ship and by the gyro; for the global stresses of the hull girder, the data provided by the Long Base strain gauge positioned at the centerline; for the local stresses, the data provided by strain gauges located at critical points.

Therefore, the integrated system according to the invention only requires a small number of sensors to have some real data in real time with which the information obtained from the results of the calculations on the structural and/or hydrodynamic models can be calibrated and integrated, thus obtaining greater accuracy thereof; at the same time, the model results are used to extrapolate the measurements taken at a few points on other points of interest of the ship structure to determine the "Safe Operating Envelopes" relative to both the global (as in the active guidance systems) and the local structural stresses of the ship.

A multiple improvement of the performance of the systems described above is thus obtained:

compared to the "traditional" structural monitoring systems, the integrated system according to the invention allows decreasing the number of sensors installed on board, using the numerical analyses that are usually carried out (at least in part) during the ship design process. The system costs and especially the overall dimensions of the onboard installation are reduced to just a few points of interest: this takes on greater importance in the case of ships already delivered or in which the installation of sensors is difficult from a regulatory point of view (for example, environments with a risk of fire/explosion) or from the point of view of the accessibility of the room or the area to be monitored;

compared to the "traditional" structural monitoring systems, the integrated system according to the invention may comprise all of the functions of the "active guidance" systems since it provides the officers with the interactive "Safe Operating Envelopes" updated in real time on the basis of the operating and weather (sea/wind) conditions of the moment;

compared to the "active guidance" navigation support systems, the integrated system according to the invention allows accessing the additional class notation for the structural monitoring and having greater accuracy of the data provided and expected, due to the real time calibration of the data extracted from the numerical models with the values recorded by the sensors;

compared to the "active guidance" navigation support systems, the integrated system according to the invention allows correcting the values calculated for the "virtual" measurement points with the results of the values measured by the real sensors, thus improving the already good accuracy of the stress calculation through the response operators prewired in the software;

compared to the "active guidance" navigation support systems, the integrated system according to the invention allows recording (at the real measuring points) and estimating (at the "virtual" measuring points) the width and number of the fatigue stress cycles in order to calculate the residual life of the structural details of greatest interest.

In order to develop and install a system according to the invention on board a ship—in addition to what already required for a "traditional" monitoring system and to what required for an "active guidance" system, a significant activity of preliminary structural calculations on FEM models of the entire ship is required, with detailed mesh in the structure zone surrounding each "virtual" measurement point considered: it is in fact necessary to obtain the response operator of the local voltage as it derives from the global stresses to which the ship is subjected by the wave motion.

This step is particularly complicated in case of the evaluation of the local stress contribution due to the slamming/whipping effects: the dynamic response of a global/local FEM model of a ship is computationally burdensome and requires extensive experience in setting the calculation parameters; the experience accumulated over the years in this type of analysis and the comparison of the results obtained with the data recorded during real experimental monitoring campaigns also make these procedures definitely reliable.

The overlap of the local stress contribution due to slamming/whipping to that of the wave further requires an ad hoc procedure to implement within the software: it should not be limited to using local voltage values measured at some points to calibrate the local response operators referred to the gauged points and to the "virtual" points in order to calculate the current/expected maximum value in the short term in the current/expected sea weather conditions but it should also evaluate the phasing between the pattern of wave and slamming/whipping stresses so as not to overestimate the combination of the two effects.

Particularly difficult is estimating the number of slamming events expected during the period considered. Only after the occurrence of a slamming/whipping event, the local stresses due to the global wave stresses must be added to the component due to the global slamming/whipping stresses and this overlap must be done with the correct phasing.

Finally, the detailed FEM models of the structure surrounding the "virtual" measurement points are used to estimate—based on the stiffness and damping properties of the structure itself—the number and amplitude of fatigue cycles to which the structural detail considered is subjected in response to a dynamic stress state due to slamming/whipping.

In so doing, in addition to estimating the expected maximum stresses, it is also possible to calculate the number and amplitude of the fatigue stress cycles undergone to construct the relative histogram. The "virtual" measurement point therefore is equally effective in terms of structural monitoring compared to a real measurement.

BRIEF DESCRIPTION OF THE DRAWINGS

The functional and structural features of an embodiment of a system for assisting the driving of a ship according to the invention will now be described. Reference will be made to the accompanying drawings, in which.

DETAILED DESCRIPTION

Figure 1:
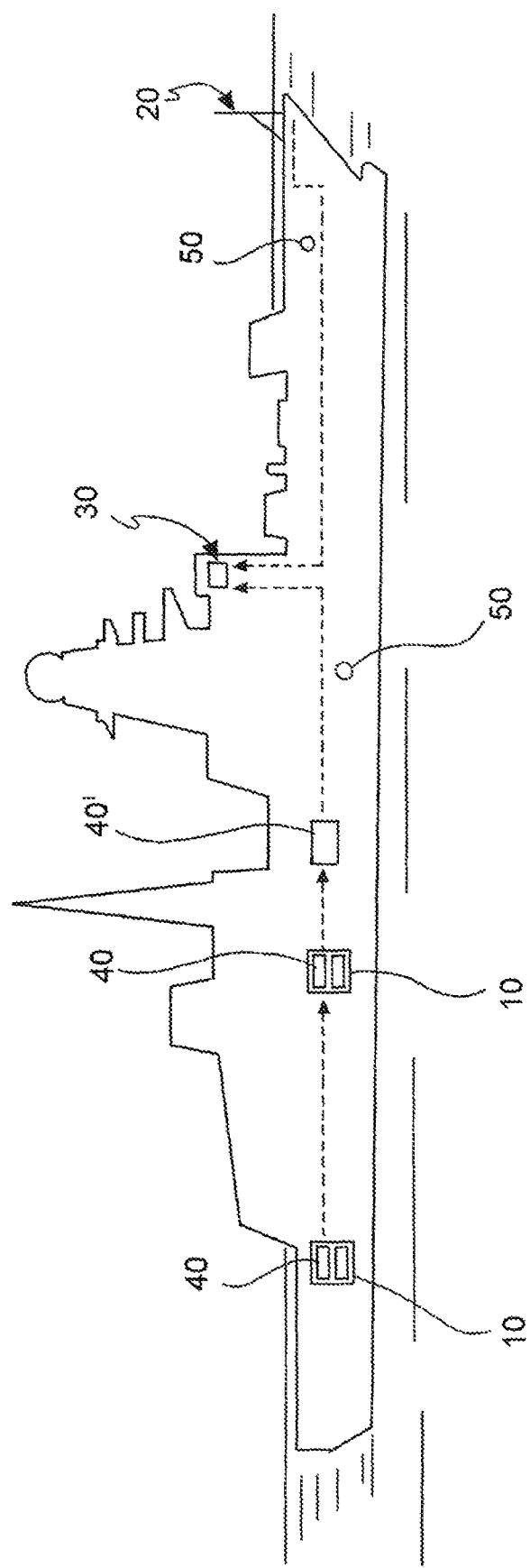
FIG. 1 schematically shows the components of the system according to the invention.

Before explaining an embodiment of the invention in detail, it should be noted that the invention is not limited in its application to the construction details and to the configuration of the components presented in the following description or shown in the drawings. The invention can take other embodiments and be implemented or practically carried out in different ways. It should also be understood that the phraseology and terminology are for descriptive purpose and should not be construed as limiting.

The system according to the invention integrates therein a structural monitoring system ("Hull Monitoring System", hereinafter, HMS) and a navigation support active guidance system, such as the "Safe Navigation System" (hereinafter, SNS) discussed in document EP 2 167 916, the description of which is incorporated herein by reference. Hereinafter, the system according to the invention will also be referred to as "Enhanced Safe Navigation System" (ESNS).

With reference to FIG. 1, the system essentially includes navigation detection means 10 (for example consisting of accelerometers, inclinometers, GPS, gyro) adapted to provide indication of the motion of the ship; environmental detection means 20 (for example consisting of a wave radar) adapted to provide indication of the wave motion of the sea; and at least one processing unit 30 operatively connected to the above means.

The system further includes local strain sensors and global strain sensors, collectively indicated with reference numeral 40. In FIG. 1, one of the sensors, indicated with reference numeral 40', represents a sensor that hereinafter will be referred to as reference sensor. The points indicated with reference numeral 50 in FIG. 1 represent "virtual sensors", i.e. points without sensors, but where it is possible to estimate magnitude values such as accelerations and/or strains, which will be clarified below hereinafter.

ESNS System Hardware Architecture

The hardware necessary to the development of the system according to the invention is essentially compatible with that already in use for the HMS monitoring system developed by the Applicant in the past. In fact, the system according to the invention can use the strain sensors provided by the structural monitoring system.

By contrast, the number of virtual sensors is theoretically infinite; currently, it is only limited to the number of channels available within the software (48) for the set of physical sensors placed on board and the virtual ones.

The system consists of a main data acquisition and processing unit (Main Processing Unit, MPU) and one or more additional Peripheral Processing Units (PPU), positioned at the main deck so as to minimize the distance from the strain gauge sensors.

Figure 1A:
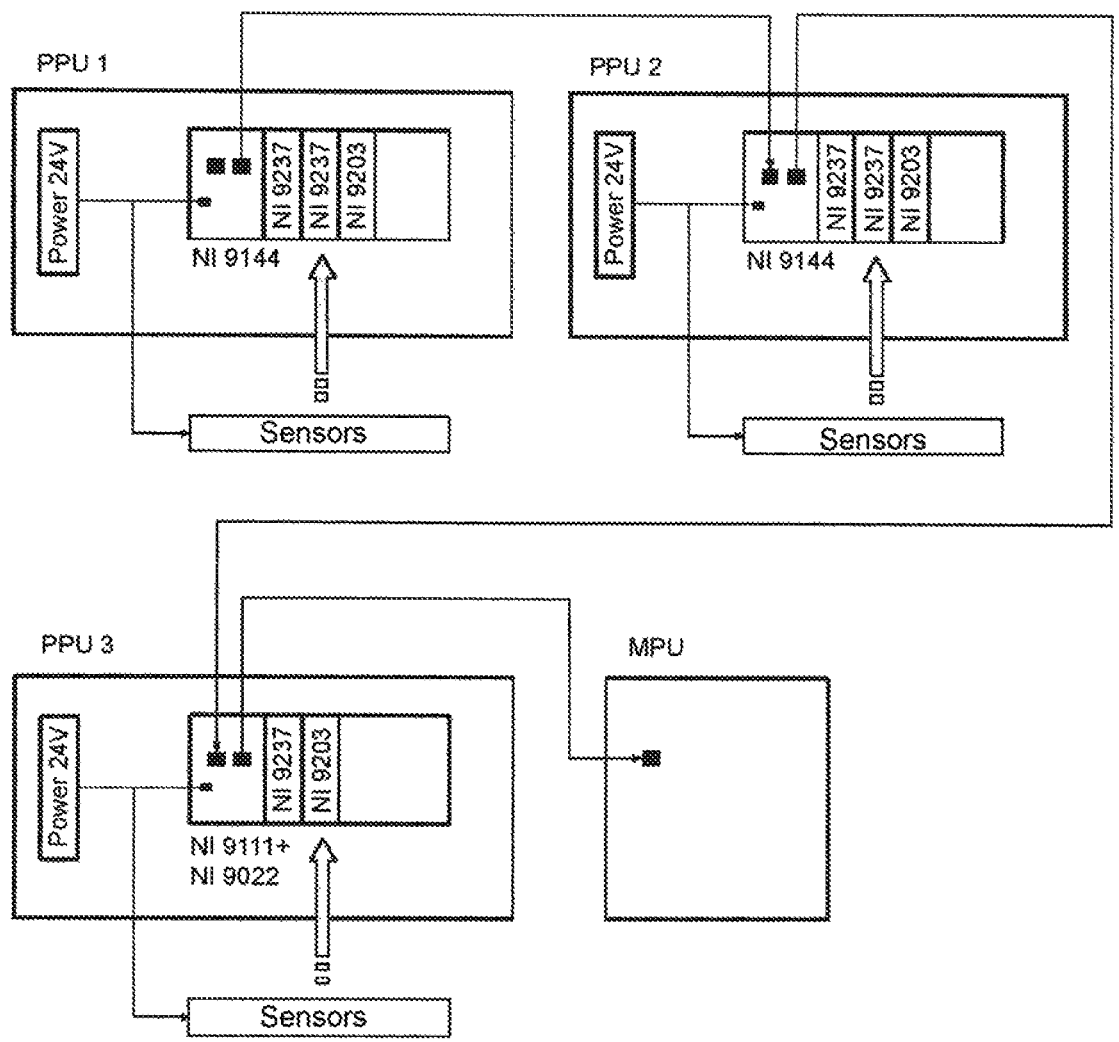
FIG. 1a shows an example of hardware architecture of the system according to the invention.

Taking as an example a system consisting of 3 PPU, the system architecture is depicted in FIG. 1a.

The embedded acquisition hardware is based on BUS/EtherCAT architecture to have maximum scalability and expandability, such as the reconfigurable control and monitoring system cRIO which, using FPGA technology, allows carrying out a series of numerical processing, thus making the main acquisition computer's work easier.

The controller inserted within a configurable chassis acquires data from the modules inserted into the chassis and from those inserted in the secondary chassis connected via EtherCAT, offering a stand-alone embedded execution specially designed for real-time applications.

The necessary modules, as required by the HMS system, are strain gauges (both for the local and the global strain measurement) and analog (for accelerometers and/or inclinometers or other analog sensors required by the specification).

The PPU internally consist of the acquisition hardware with programmable logic and a power supply that provides the stabilized voltage to both the remote sensors and to the acquisition hardware.

The present description shows a specific hardware architecture, with equally specific components as an example; however, it is understood that such examples should by no means be construed as limiting of the present invention. In fact, different embodiment variants may be conceived; in particular, the ESNS system may consist of a different architecture (such as star rather than serial connection between the PPU) and/or of different hardware components (such as acquisition units and sensors based on fiber-optic technology, rather than on the traditional electrical technology).

The acquisition hardware of the main PPU shown in FIG. 1a consists of a unit NI 9111 with programmable FPGA integrated by a real-time controller (NI 9022) and strain gauge signal (NI 9237) and current (NI 9203) or voltage (NI 9201) signal acquisition modules; the acquisition hardware of any remote PPU required consists of a unit NI 9144 operating in slave mode integrated by strain gauge signal (NI 9237) and current (NI 9203) or voltage (NI 9201) signal acquisition modules.

The connection between the PPU is via cable CAT6 and must be dedicated to the system without passing through network switches.

The specifications of the above components are as follows:

NI 9144:
8-module EtherCAT unit
I/O over high performance deterministic EtherCAT
Reconfigurable integrated FPGA gate for control, parallel processing and timing
Operating temperature range −40/+70° C., 50 g shock, 5 g vibration NI 9111:
Integrated reconfigurable FPGA Xilinx Virtex-5 gate
Automatic sintering of the custom control and of the signal processing circuit
Operating temperature range −40/+70° C., 50 g shock, 5 g vibration NI 9022
Real-time embedded controller for deterministic control, data logging and analysis
533 MHz processor, 2 GB nonvolatile storage, 256 MB DDR2 memory
Dual Ethernet ports with integrated server and server file
Operating temperature range −20/+55° C.

NI 9237
4-channel simultaneous bridge module, 24-bit resolution, 25 mV analog inputs
4 simultaneously sampled analog inputs, 50 kS/s maximum sampling rate
Programmable half- and full-bridge completion, 10V maximum excitation
Transient isolation from 1000 Vrms
Operating temperature range −40/+70° C.

NI 9203
8-channel current input module
Programmable input ranges 4-20 mA or 0-20 mA
Operating temperature range −40/+70° C.
16-bit resolution, 200 kS/s aggregate sampling rate NI 9201
8-channel voltage input module
Programmable input ranges +/−10 V
Operating temperature range −40/+70° C.
12-bit resolution, 500 kS/s aggregate sampling rate In the simplest configuration (not shown), characterized by the minimum number of sensors required to meet the requirements of the RINA notation MON-HULL, only the Master unit is required to acquire signals from the sensors.

For more complex configurations (such as that in FIG. 1a), in which a greater number of sensors deployed along the entire ship length must be acquired, some Slave units must be installed so that the acquisition module is sufficiently close to the strain gauge sensors, so as to minimize the noise on the signal acquired due to the cable.

The main acquisition system, i.e. the Main Processing Unit (MPU), consists of an industrial computer and carries out the following tasks:
Receives data from the PPU;
Receives data from the automation;
Receives and processes data relative to the sea state;
Executes the ESNS program comprising both the features and the functions of the structural monitoring program and those of the active guidance program;
Displays and saves the data;
Checks the limits set;
Shows any alarms on its console;
Sends data and alarms to the ship automation and/or to the VDR (Voyage Data Recorder).

The main acquisition system consists of a rugged, fanless industrial computer on which the ESNS system is installed together with an embedded acquisition hardware.

The computer is equipped with at least the following:
Intel Core i7-620LE 2.0 GHz+QM57 chipset
128 GB SSD HD SATA 2.0
RS232/422/485 configurable serial ports
2 Ethernet ports
Embedded VGA board, res. 2048×1536
4 GB 800/1066 MHz DDR3

The acquisition unit is equipped with a screen to display the acquired values and for the interaction with the operator.

The system according to the invention includes a set of sensors and detection devices. In particular, it includes true strain sensors. These sensors are devices that physically measure a true strain onto the structure of the ship. They consist of transducers and a possible temperature compensator.

In particular, local strain gauge sensors are included herein. These sensors are main sensors both for measuring the real strains occurring on board and for the interaction with the ESNS internal calculation routine which, based on precalculated response operators, calculate voltages/strains in ungauged points of the ship based on the current/expected operating and navigation conditions. The strain gauge sensors must be perfectly adhering to the structure, without the risk of separation and thermal drifts: therefore, only weld strain gauges should be taken into consideration instead of bonding ones and either a temperature measurement sensor (thermocouple) will be placed in the immediate vicinity of the sensor or the system will be provided with a strain gauge compensation through dummy strain gauge. However, the latter is preferred so as to have a half-bridge measurement configuration: one branch consists of a strain gauge placed at the measurement point, while the other branch consists of a strain gauge compensator, placed in the vicinity of the measurement point, but mechanically isolated from the first branch to compensate the strains due to temperature. In this way, only a strain gauge measurement already thermally compensated is required rather than having to take two different measurements (strain gauge and thermal) and having to make an additional processing for the thermal compensation.

Moreover, the sensors must be properly sealed against moisture and dust infiltration (IP56) and mechanically protected.

Sensors for global strain are further included. These sensors are the main element of the monitoring system. Their position is determined by the requirements of the classification society and the client's, keeping in mind the high dimension of this sensor, which is around 2.5 meters in length.

The sensors in question may essentially consist of a steel bar which acts on a strain gauge displacement transducer with infinite resolution. A hull girder strain implies a displacement of the bar and, consequently, the compression/extension measurement by the transducer. Considering the type of sensor (wheatstone bridge with 4 active branches) and the type of material selected for the bar (steel, like the structure of the hull girder), the strain due to thermal gradient is compensated directly by the sensor and therefore does not require a temperature sensor or a thermal compensator.

The protection must be at least IP56 also for this sensor.

If the sensors must be installed in zones that may be flooded, such as in the bilge, the protection of the component will have to be optimized so as to make it immersion-resistant (IP67).

Analog sensors are further provided. The ship motion measurement sensors (accelerometers, inclinometers, pressure probe), in addition to being listed in the Register requirements for obtaining the additional class notation for the structural monitoring, are required in the post-analysis step to correlate the hull strains measured. Considering the flexibility provided by the architecture, analog channels may be added at any time on the customer's request.

The ESNS system has the following input/output connections: GPS, gyro and VDR.

The system receives data from the ship GPS via standard serial connection with sentences useful for defining position, speed and time. The sentences required are as follows: GLL, VTG, ZDA.

The system further receives data from the ship gyro via standard serial connection with HDG or HDT sentences useful for defining the direction of the bow with respect to the North.

The system must communicate the necessary information to the onboard Voyage Data Recorder as indicated by the requirements of the classification society of the ship. The connection is standard serial with sentence agreed upon from time to time with the manufacturer of the VDR system. If the automation system has a connection to the VDR, this equipment may be set to communicate the data to the VDR.

The ESNS system also interfaces with the ship automation. The interface with the automation may provide the exchange of both inbound and outbound information. For example, the automation can provide the states of some apparatuses of which monitoring is required, or it may pass some information not available point-to-point (such as gps, gyro, wind data, . . . ).

The outputs to the automation system are required to comply with the requirements of the Registers about the reporting of any alarms on the bridge.

The ESNS system also interfaces with the system for measuring the state of the sea. The system for measuring the state of the sea is a fundamental component of the ESNS system.

The source of information is the X-band navigation radar already present on any ship, suitably configured and used, whose data (ACP+ARP, image, trigger, etc.) are acquired by an interface device (Integrated Video Digitizer) which allows a dedicated software to extract information about the state of the sea in terms of significant height, direction and period.

The reflections of the radar on the waves are typically considered noise when the radar is used for the routing check operations during the navigation, and therefore are typically filtered by the systems on the bridge. On the contrary, this signature represents the signal useful to be processed when the purpose is to extract sea state parameters.

Figure 2:
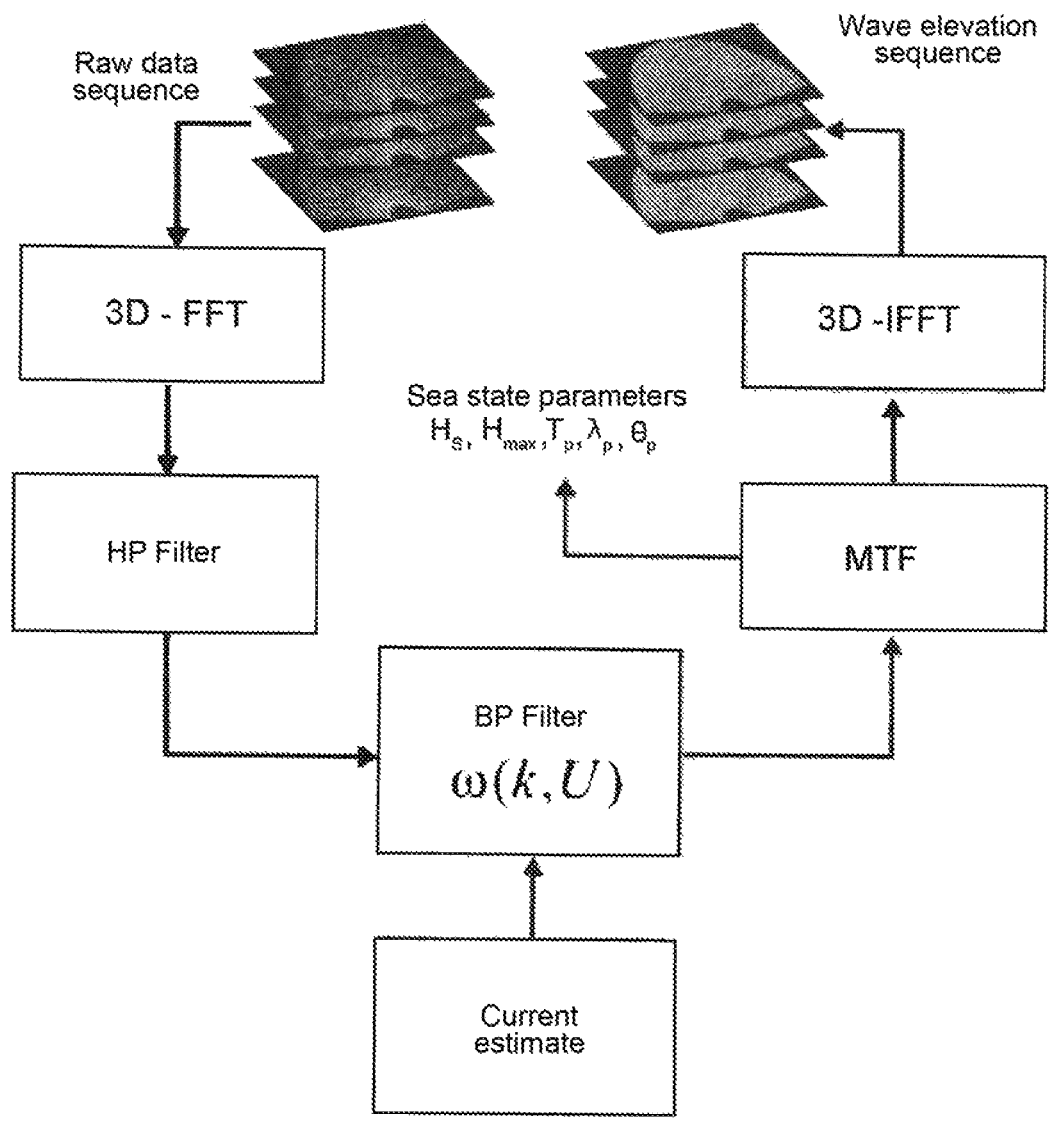
FIG. 2 shows a block diagram representing a process of reconstruction of the wave motion starting from radar images of the sea.

The radar image is not a direct representation of the state of the sea and a transformation procedure is therefore required: in particular, data processing is an inversion problem in which, starting from a set of radar images collected at different time instants, the elevation of the sea surface understood as a function of two spatial (related to the area observed by the radar) and time (see FIG. 2) variables is to be determined.

Starting from the raw images acquired by the radar, after a first 3D Fourier transformation of data, a first filtering is carried out—constructed starting from the knowledge of the sea surface currents—to eliminate any undesired phenomenon due to dispersion. A transfer function called Modulation Transfer Function is then used to convert the images of the radar and obtain the data about the state of the sea.

This information—in addition to being used as input data by the ESNS to calculate the motions and stresses in ungauged points—is saved along with the data from real and virtual sensors, to allow the user in the post-processing step to correlate the operating conditions of the ship and the structural stresses.

HMS System Software Architecture

Figure 3:
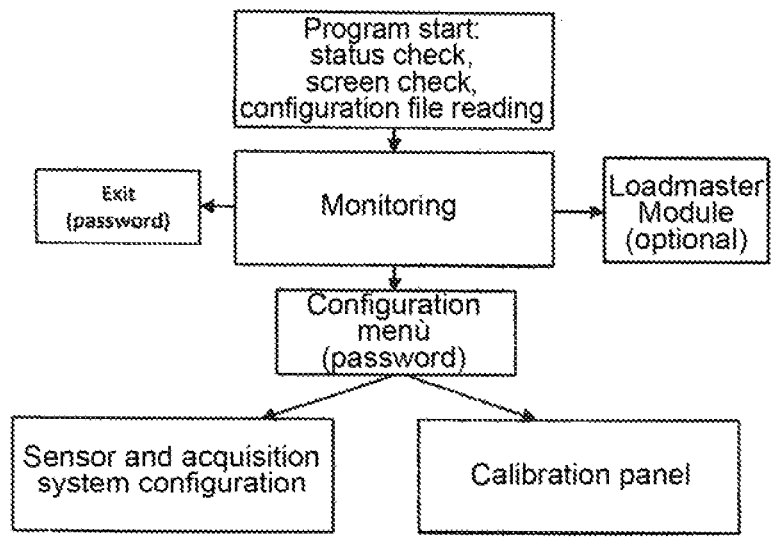
FIG. 3 shows a block diagram representing a main panel of a structural monitoring module management software.

The Sh.A.M.An. (Ship Advanced Monitoring and Analysis) software developed by the Applicant to check the HMS structural monitoring system is designed with a dynamic architecture: a main panel hosts each dynamic sub-panel that manages specific features requested by the user (see FIG. 3).

The first test that is performed is a check of the system status before accessing the program. In the event of incorrect shut-down or forced reboot of the machine, a flag in the registry allows managing a warning concerning the error condition in question.

The software reads the configuration file of the program to initialize the variables and checks the correct minimum screen resolution to ensure a proper display as required by the Register: if the resolution is inadequate, the program stops with an error message.

Following the startup procedure, the monitoring panel is opened directly using the information contained in the last valid configuration file.

The user can switch from one sub-panel to the other using the buttons positioned on the main application bar.

Figure 4:
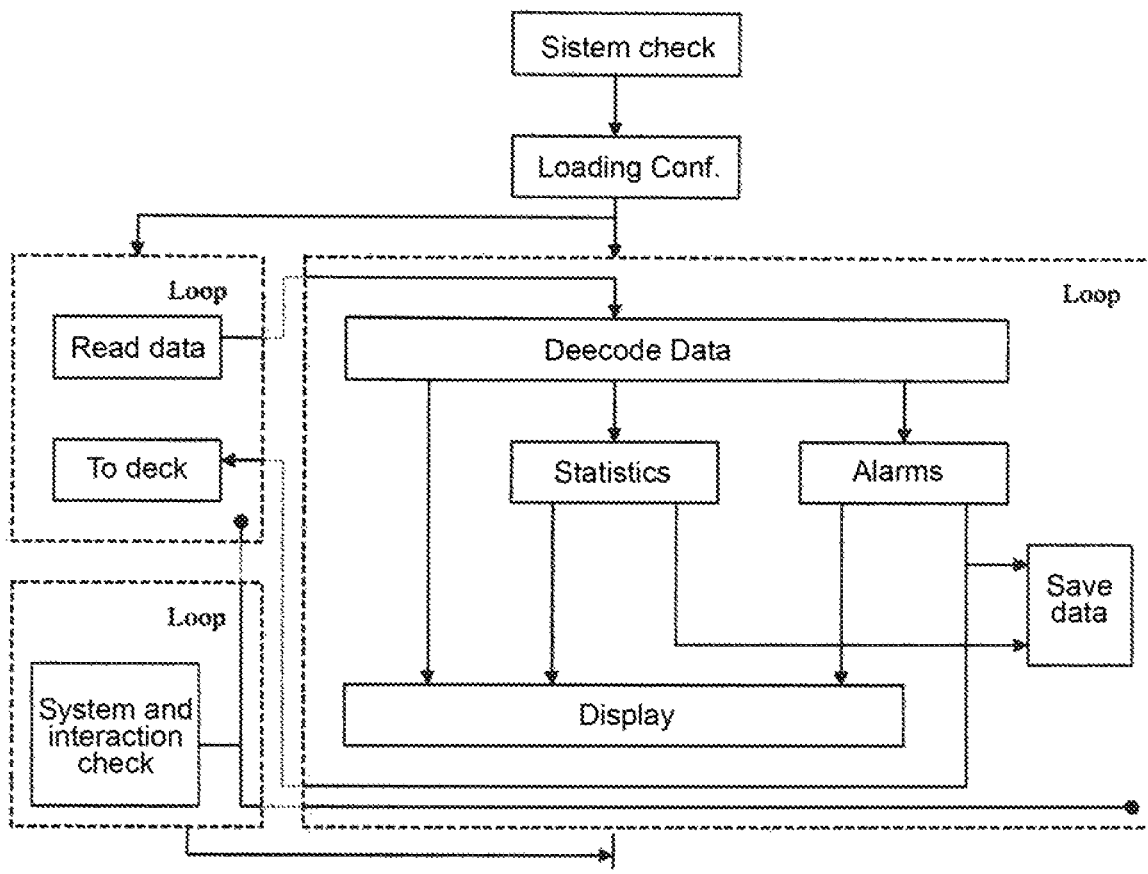
FIG. 4 shows a block diagram representing a monitoring panel of the module in FIG. 3.

The main functional block of the monitoring panel is shown in the diagram in FIG. 4. The main aspects of the above functional blocks are:

Data reading: it receives data from the serial ports configured and from the TCP/IP connections and places them in the trace buffer Data decoding: it receives data from the buffer and checks the data type as indicated in the configuration module. The strings allowed are as follows:

N: navigation data: GPS, wave height sensor, wind speed, . . . .

T: all the sensors from the acquisition system, such as accelerometers, strain gauges, . . . . .

Each signal category is treated separately: the strings are processed on two parallel processes, depending on the type of connection: serial or TCP/IP.

Each string contains a number of samples equivalent to the sampling rate multiplied by the number of hardware sensors. The value contained in the strings is converted from text to number and organized in a vector. The data received are scaled as expected in the configuration module and converted into a double numeric precision vector.

Statistics: the data vector is analyzed statistically in two ways. The first analysis is managed so as to update the data shown on screen: the refresh interval can be manually changed by the user using a special control located on the screen. The second analysis relates to the collection of statistical data to be saved to disk: the frequency of this calculation is set in the configuration module. Both analyses calculate the following statistical values for each sensor: maximum, minimum, average and standard deviation.

Figure 5:
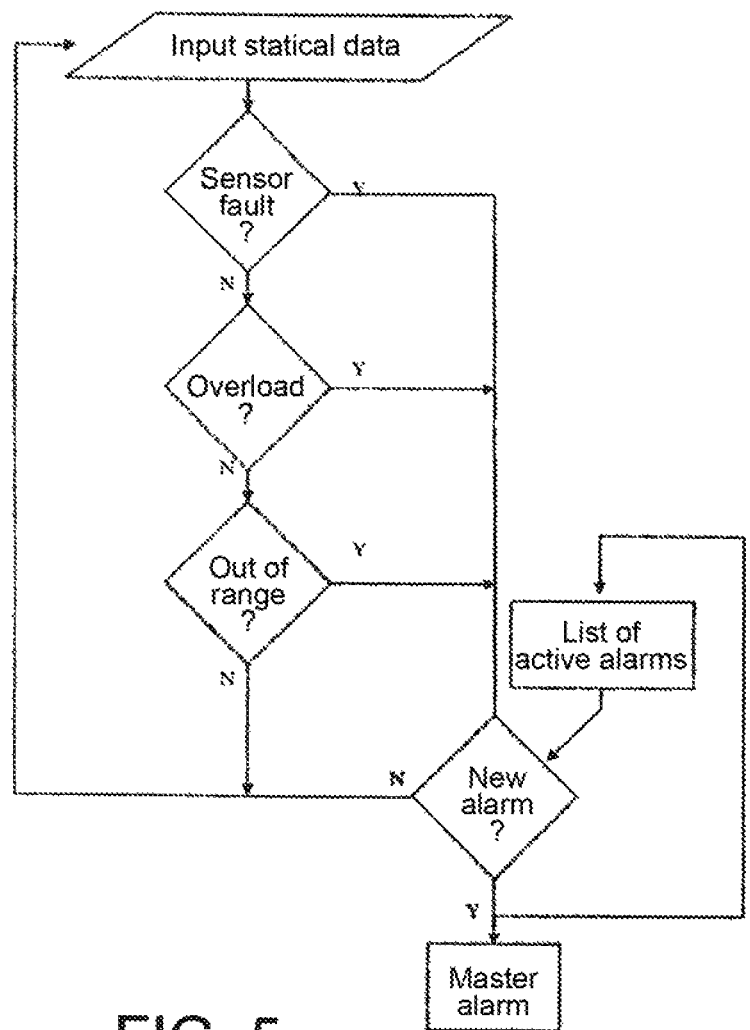
FIG. 5 shows a block diagram representing the management of alerts in structural monitoring module.

Alarms: alarm verification is performed whenever the program updates the data displayed on screen. The alarm is activated according to the algorithm shown in FIG. 5.

When a sensor reaches an alarm status, a "Master Alarm" is activated, which remains active until it is acknowledged by the user, even if the sensor returns to acceptable values.

If a situation occurs in which the alarm status of a sensor that was previously acknowledged continues, the "Master Alarm" is activated only if there is a new alarm of a new sensor to prevent displaying the same alarm repeatedly.

Alarm management in the HMS software is implemented in accordance with the regulations of the IMO Code on Alarms and Indicators.

Figure 6:
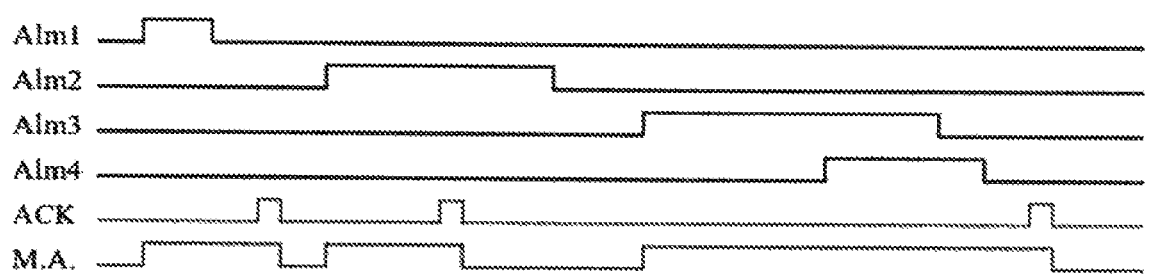
FIG. 6 shows a temporal graph showing an example of processing the alert signals.

As an example, FIG. 6 shows how the evolution of alarm signals is treated.

System check and interaction: checks the correct operation of the software and allows the user to interact with the monitoring program, for example to change the refresh rate, look at the event log, stop the acquisition. This part of the program also manages and controls the other parallel and concurrent processes.

More details about the architecture and algorithms of the HMS software are described in G. Cusano, M. Garbarino, 'Sh.A.M.An. (SHip Advanced Monitoring and ANalysis) system: principles and algorithm used for data processing', CETENA Report no. 11222, Genova, Mar. 16, 2012, incorporated herein by reference.

Figure 7:
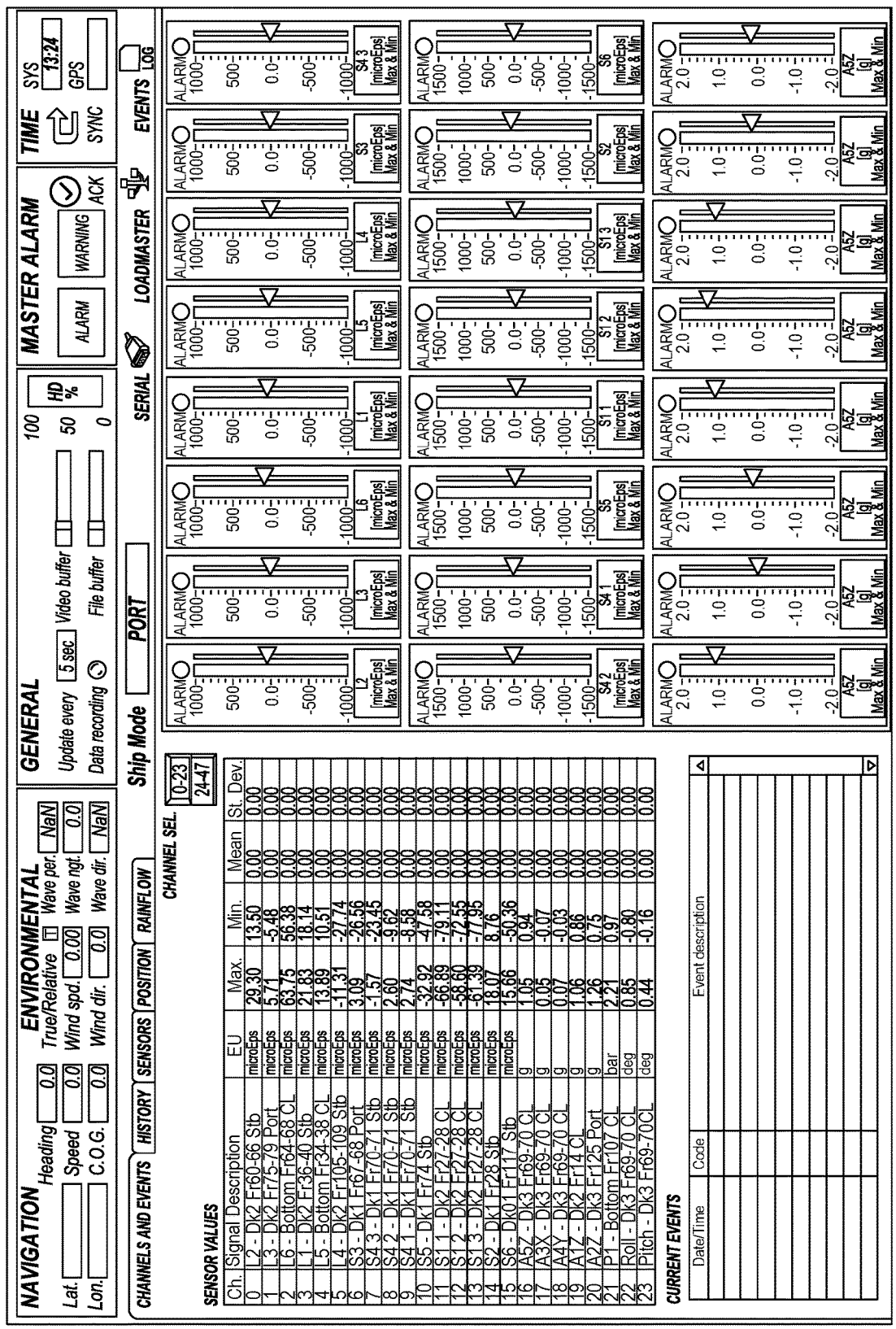
FIG. 7 shows a main screen of a structural monitoring software.

The main screen of the HMS Sh.A.M.An. is shown in FIG. 7.

SNS System Software Architecture

The object of the proposed system is to show to the board officers the short-term consequences of a decision on the change of the current direction/speed based on the sea conditions actually experienced by the ship at the time.

To this end, two main ingredients are needed:
 a reliable measurement of the sea conditions in the vicinity of the ship, in terms of height and wave period;
 a mathematical model of the ship able to predict with reasonable accuracy the dynamic behavior of the latter as a function of the operating and sea conditions.

Figure 8:
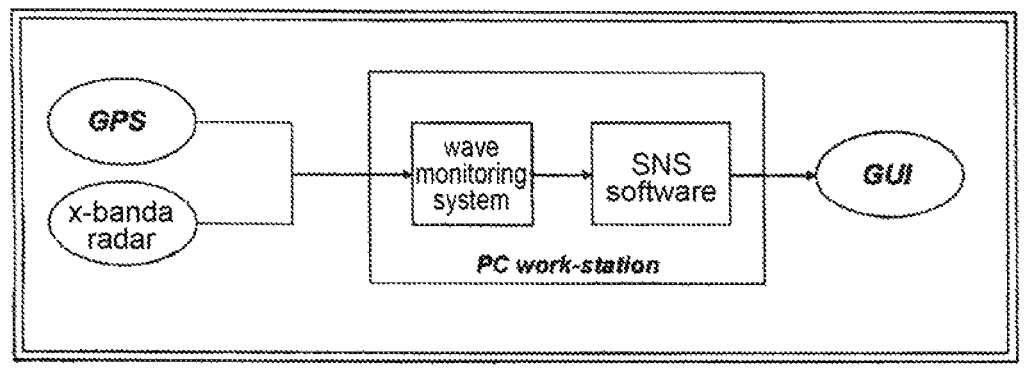
FIG. 8 shows a block diagram representing an active guidance module of the system according to the invention.

The SNS software does not execute direct calculations of the dynamic behavior of the ship, but merely interpolates the pre-calculated results at the current marine/operating conditions obtained from the interface with the onboard systems (GPS and wave radar) and displays them on a dedicated Graphic User Interface (see FIG. 8).

The software core therefore is the model of the ship consisting of the tables of the response operators of motions and stresses. They must be prepared before the onboard installation of the system using the appropriate software tools: in the case of SNS, for the prediction of the rigid body motions and the global dynamic loads induced directly by the wavy sea, the calculation model PRECAL was used, developed and validated in more than 20 years of research within the international consortium CRS (Co-operative Research Ship). Such a calculation package is capable of performing both conventional linear forecasts in the frequency domain and non-linear simulations in the time domain.

To predict the effect of the hull girder vibrations induced by impact pressures on the global dynamic loads, on the other hand, the know-how generated by the project 'SafenVShip' was used.

The calculations are generally performed for the following conditions:
 13 meeting angles between 0° sea at the bow and 180° sea at the stern every 15°;
 6 ship speeds between 0 and 25 knots every 5 knots;
 8 sea periods between 6 and 22 seconds every 2 seconds.

The preparation of these results requires an accurate knowledge of the geometry of the ship, its loading conditions and its structural characteristics.

The processes qualifying the calculation software are as follows:
 evaluation of the impact forces on the bow area of the ship;
 evaluation of the shear and moment contribution due to the impact forces;
 combination of the wave contribution and the impact contribution, or whipping.

The correct combination of wave and whipping contributions is crucial for a reliable prediction of the resulting shear/moment on the ship.

The software then provides the following features:
 OFF-LINE: production of tables with bending moment as a function of the ship speed, significant wave height and wave meeting angle with the ship bow.

ON-LINE: Graphical display of the following data:
Position (latitude and longitude);
GPS time;
Speed and heading;
Significant wave height and direction;
Polar diagram with pattern of the bending moment, vertical shear or vertical acceleration on the basis of changes in the ship direction or speed;
Storage of historical data displayed.

Figure 9:
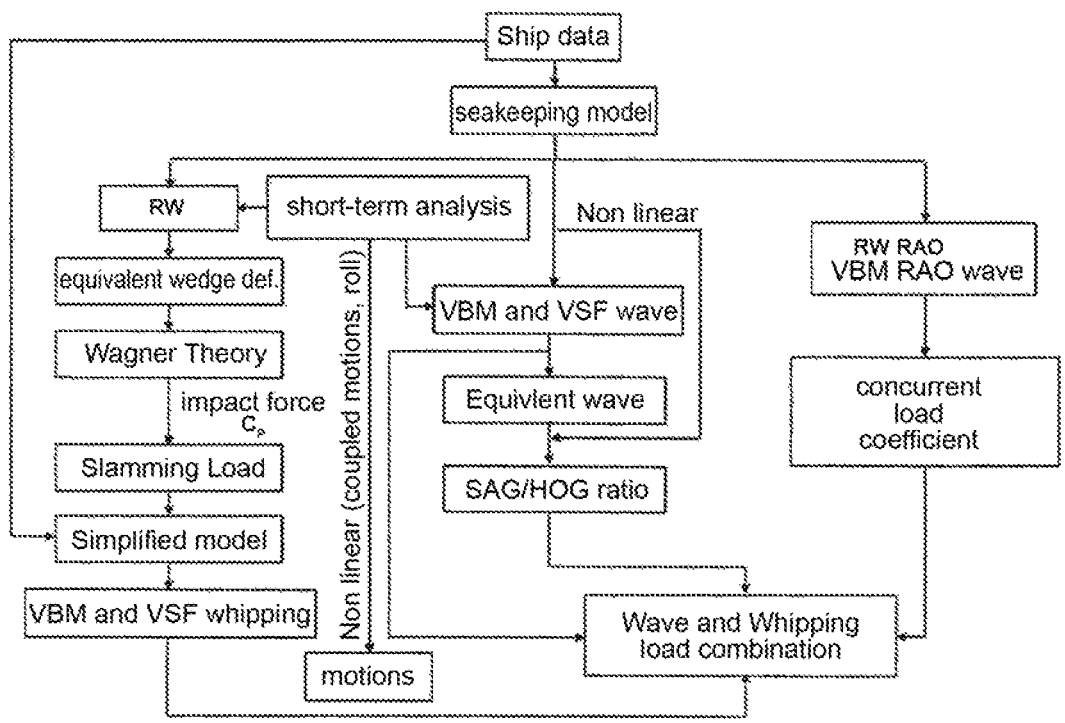
FIG. 9 shows a block diagram representing a calculation model implemented in the active guidance software.

The functional diagram of the calculation model implemented in the software is shown in the block diagram shown in FIG. 9.

The system may be divided into 6 main parts:
Calculation of the response operators in acceleration (vertical and lateral) frequency, of the relative vertical speed and of wave stresses (VSF and VBM);
Calculation of slamming loads;
Prediction of whipping stresses (VBM and VSF);
Determination of the sagging/hogging ratio for wave loads;
Calculation of the load combination coefficients;
Combination of whipping and wave loads which are added to the loads in still water entered into the software as a function of the current load condition of the ship.

All of these parts require the use of an appropriate seakeeping model: normally, the PRECAL code is used which offers a 3D seakeeping code (both linear and non-linear).

The following is the description of the main blocks of the SNS:
Ship data: the block refers to data concerning the ship which must be entered in order to be able to perform all the operations required by the calculation system; in particular, the geometry of the hull and the structure of the ship must be known in detail.
Seakeeping model: the role of the seakeeping model is to provide the mechanical response of the ship to the wavy sea in terms of so-called transfer functions or response operators (RAO, Response Amplitude Operator), in the hypothesis of rigid body and linearity. The hypothesis of linearity, namely of proportionality between wave excitation and response of the ship, allows describing the latter in terms of how much the ship response amplifies and goes out of phase with respect to a single regular wave. The hydrodynamic model of the PRECAL requires to outline the wet ship surface through a system of quadrilateral flat panels, at the center of each a pulsing source is placed which mathematically represents the wave disturbance. The resulting action of the wave is therefore provided by the overlap of the single actions exerted by each source.

In the case of the SNS, the RAO of the relative vertical speed at the bow area of the ship (RVV) and of the bending moment at the centerline (VBM) are determined for different ship speeds and directions of sea-ship encounter in a wide range of regular waves.
Short-term analysis: it carries out the statistical prediction of RVV and VBM (in terms of more likely maximum value) for a given state of the sea and for the exposure time entered by the user, through a combination of the JONSWAP spectrum of the sea with the response operators: in fact, in the hypothesis of linearity, the response of the ship to a predetermined state of the sea is provided simply by the overlapping of its response to the single regular waves that make up said state of the sea.

SAG/HOG report: since PRECAL calculates the bending moment at the centerline according to the linear theory (block WAVE VBM ship centerline), a correction factor of the SAG/HOG ratio is introduced, based on the suitable Classification Rules in order to distinguish between sagging wave moment and hogging wave moment. In fact, the linear theory cannot differentiate the two contributions above in absolute value but only in sign: from the physical point of view, the difference between the two wave values is due to the non-linear effects associated with the exit and entry of the bow part of the ship in the water, which can vary significantly with respect to the static waterline.

Slamming load: it calculates the slamming loads on the bow part of the ship starting from the relative bow vertical speed (RVV) and from the approximation of the bow end of the ship above the waterline at a wedge of length equal to Lpp/20 and a geometric inclination angle (deadrise) b, an operation performed by the block Definition of equivalent wedge. The block Wagner Theory allows evaluating the slamming force acting on the bow part of the ship starting from the value of the impact pressure on the equivalent wedge that penetrates with constant vertical speed in a free undisturbed surface. The coefficient $C_p$ Impact force of maximum pressure and the slamming force F are:

$$C_P = \frac{\pi^2}{4 \cdot tg^2 \beta}$$

$$F = p \cdot S$$

where $$F = \frac{1}{2} \cdot \rho \cdot C_p \cdot S \cdot RVV^2$$

On the basis of the maximum impact force, the module Slamming load determines the temporal history of the slamming pulse, characterized by an average length depending on the type of ship.

Figure 10:
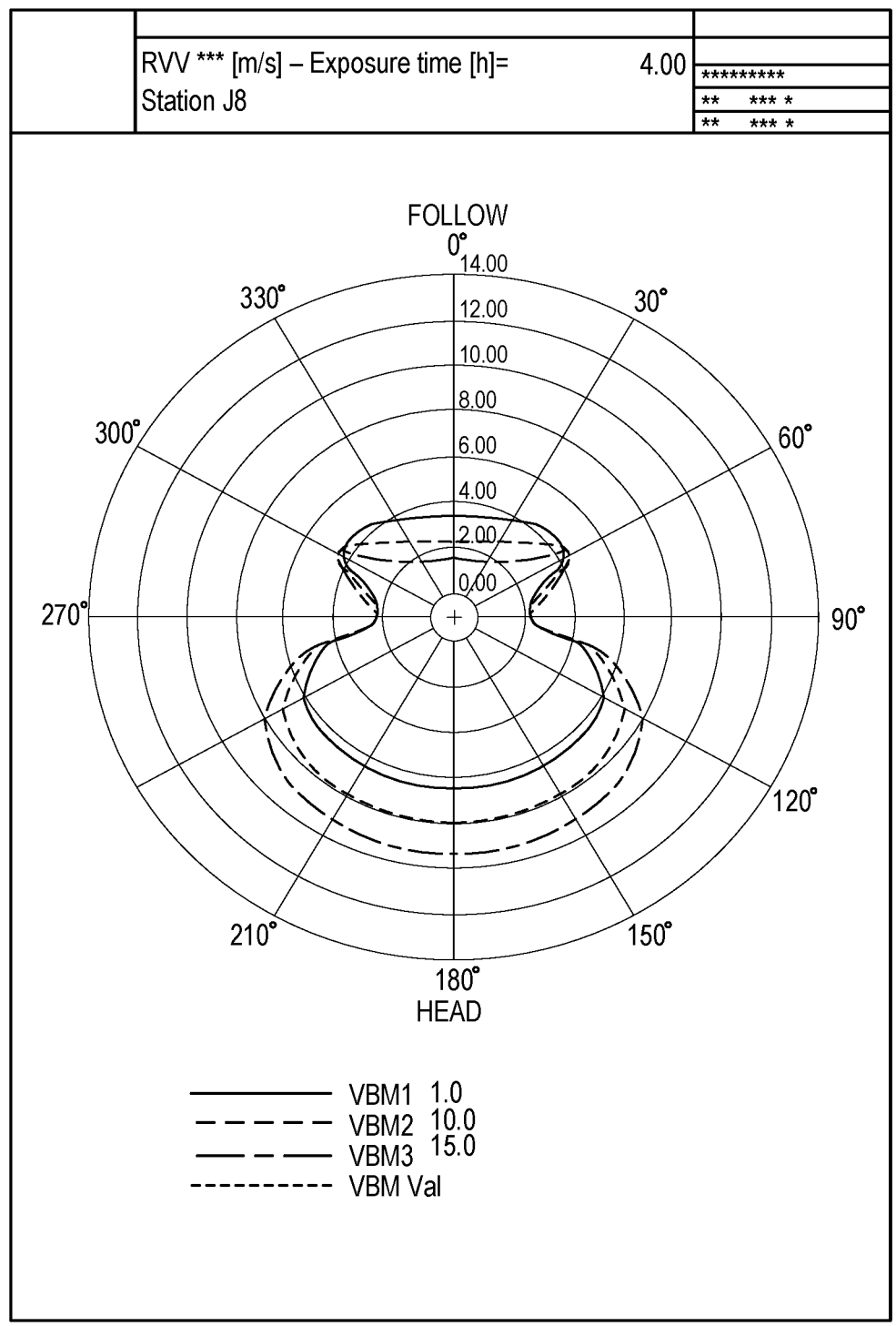
FIG. 10 shows a polar diagram showing, by way of an example, the statistical RVV prediction of a cruise ship in a predetermined sea state for different ship speeds and sea directions.

FIG. 10 shows by way of example the statistical RVV prediction of a cruise ship in a determined sea state for different ship speeds and sea directions.

VBM whipping at the ship centerline: it calculates the whipping moment at the ship centerline using a simplified physical model of the hull girder (Simplified model), with one degree of torsional freedom—consisting of two beams connected by a torsion spring that simulates the elasticity and of a torsional damper that simulates the torsion damping—solvable analytically.

Combination of whipping and wave loads: it performs the combination between the wave moment and the whipping moment, which is the core of the SNS system, based on the equivalent wave concept (block Equivalent wave) in order to determine the appropriate combination coefficients (block Load contemporaneity coefficient). The main assumption is that the maximum of the relative vertical speed and the slamming impact force are in perfect phase, so the maximum value of the whipping contributions to shear/bending moment is calculated according to the maximum value of RVV by block VBM whipping at the ship centerline.

Figure 10A:
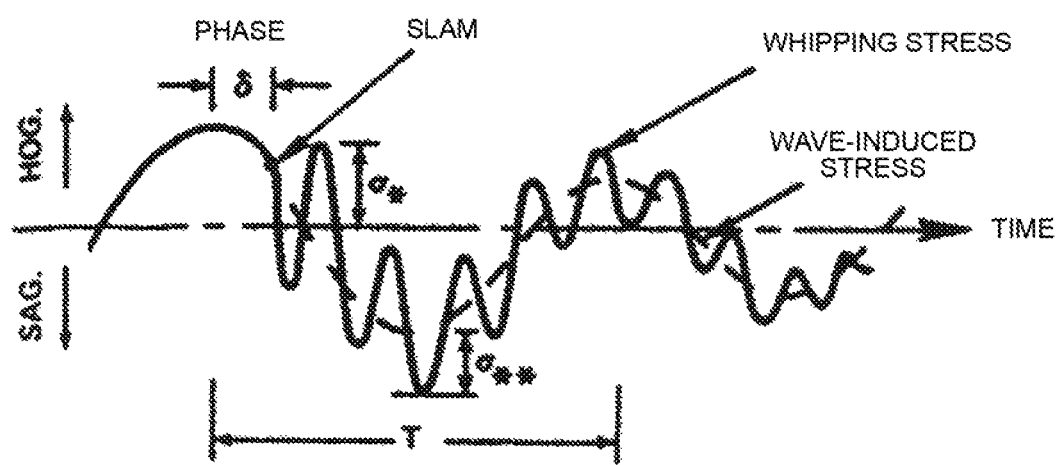
FIG. 10a shows a temporal graph showing the effect of the whipping contribution due to slamming on the total bending moment of the ship.

However, wave moment and whipping moment are two uncorrelated magnitudes, so the simple sum of the respective maximum values leads to excessively overestimate the expected loads. The overlapping of the wave and whipping contributions occurs by combining the maximum contributions thereof (relative to unit wave height) by suitable coefficients calculated on the basis of considerations relating to the dephasing between relative vertical speed and the wave stresses and by suitably scaling the values obtained with respect to the reference wave height determined as the regular wave that generates a vertical hogging bending moment equal to that calculated by the statistics in the short term. To this end, FIG. 10a shows the effect of the whipping contribution due to slamming on the total bending moment (same magnitude as the wave contribution, phasing depending on the ship and on the navigation conditions).

Figure 11:
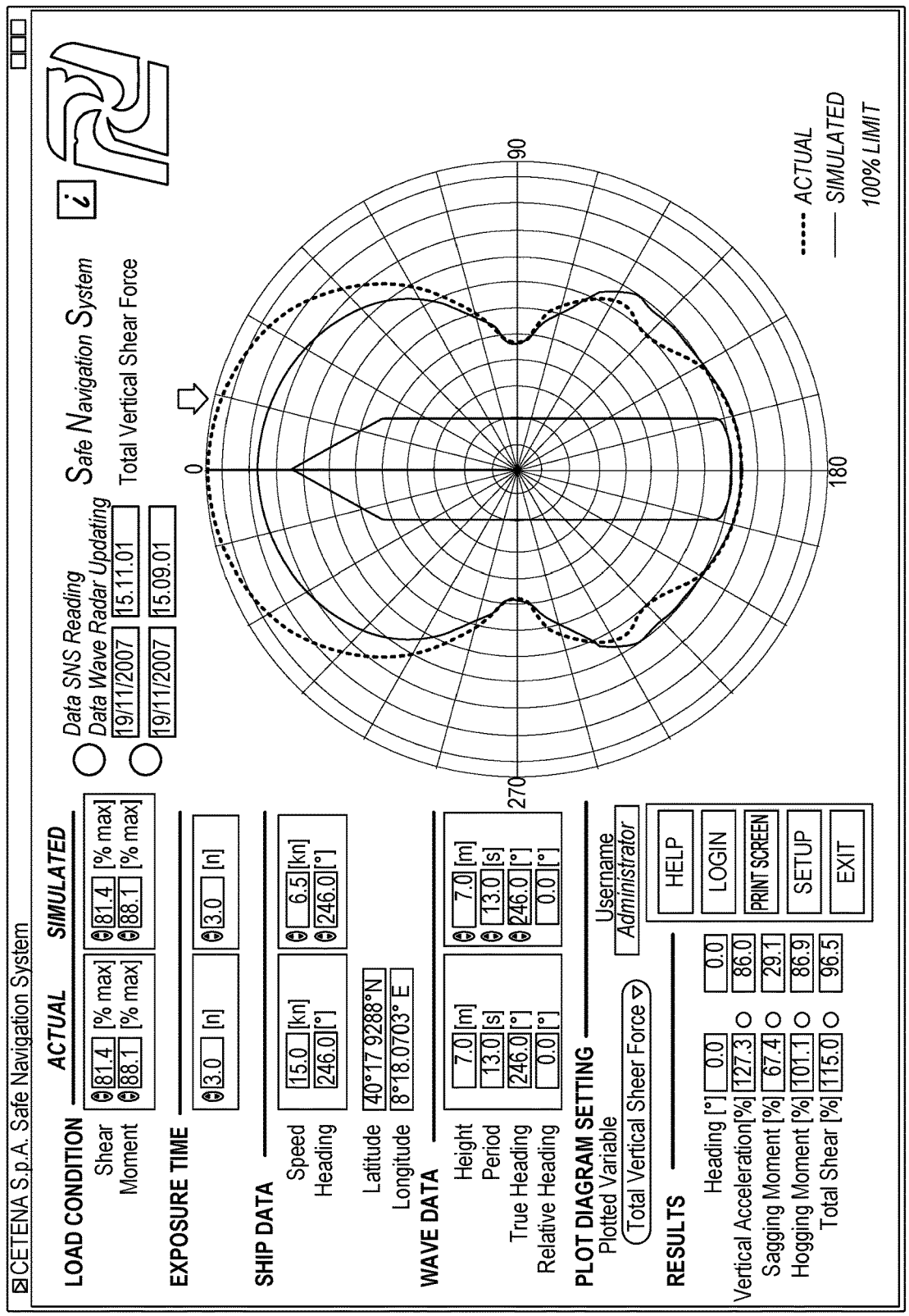
FIG. 11 shows a main screen of an active guidance software.

The main screen of the SNS is shown in FIG. 11.

ESNS System Software Architecture

Figure 12:
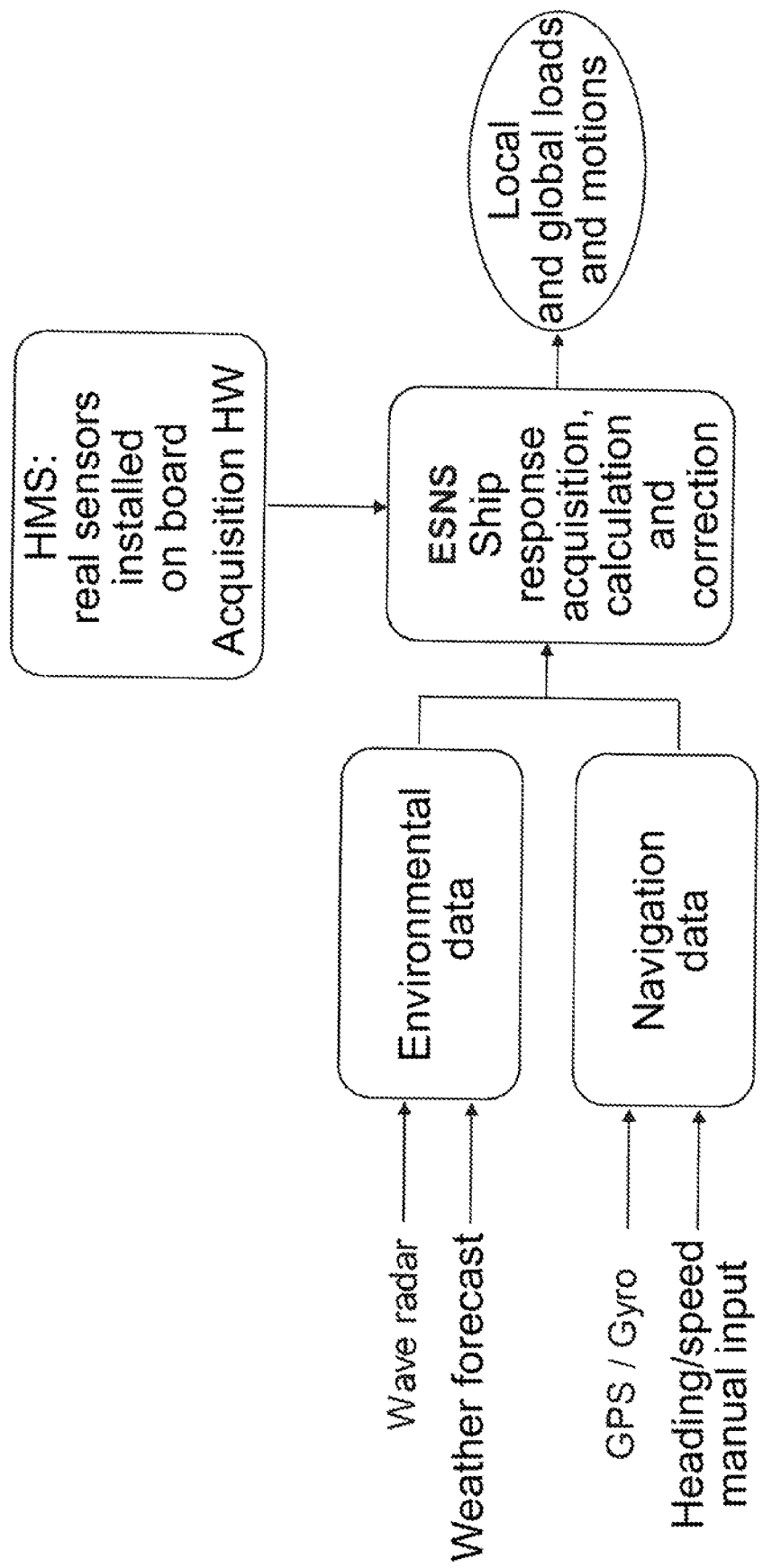
FIG. 12 shows a diagram summarizing the operating principles of the system for assisting the driving of a ship according to the invention.

The diagram in FIG. 12 summarizes the operational features of the ESNS system according to the invention.

Figure 12A:
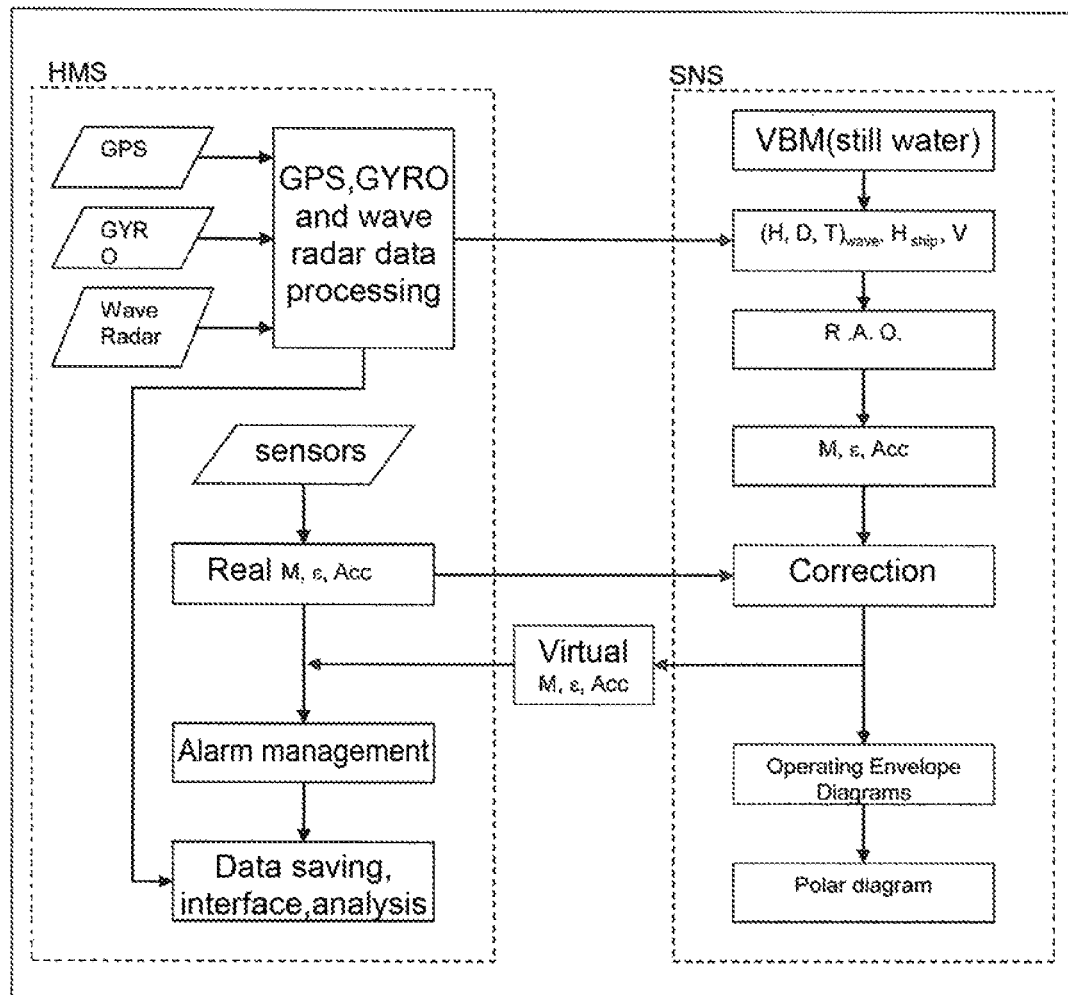
FIG. 12a shows a block diagram showing the architecture of the system for assisting the driving of a ship according to the invention.

The diagram in FIG. 12a shows the architectural principle of the ESNS system, starting from what already exists in the Hull Monitoring Systems and in the Safe Navigation Systems. Dash-and-point lines show the features that have been introduced in the ESNS system.

The HMS system is already configured to interface with GPS, gyro and X-band navigation radar on board. The GPS information, in addition to being used by the HMS system to know speed, position and route, is also processed by the subsystem for the measurement of the state of the sea which allows obtaining the data related to wave height, period, and meeting direction of the wave motion.

The information concerning the state of the sea (significant wave height, average period and meeting direction with respect to the ship prow), the ship heading from the gyro and the ship speed from the GPS, is provided directly to the SNS module: while in the earlier version of the SNS, the passage of information was done by reading a text file, with synchronization problems in reading/writing the same, by integrating the two systems the information may be directly sent at the kernel level of the software.

The original SNS system, once the wave and direction/speed data have been acquired, queries a Response Amplitude Operator (RAO) which in output allows estimating bending moment, strain and acceleration. This information is provided to an OED (Operating Envelope Diagram) which displays the current ship situation on a polar diagram, allowing the simulation of some of the possible variations (route, speed, displacement) visually verifying the accuracy of such actions before putting them into practice.

The availability of sensors physically installed on board allows a real-time correction of the valued predicted by the RAO with high precision, improving the effectiveness of the SNS module integrated with HMS. Moreover, always using the response operator and the real-time correction via feedback on the values measured by the real sensors, it is possible to estimate the strain and motions in ungauged ship points, thereby allowing virtual sensors to combine with the traditional sensors within the HMS.

The HMS system will therefore treat these sensors like sensors physically installed on board, monitoring the values thereof, creating appropriate alarms in case of exceeding of threshold values, saving statistical data.

The additional features of the ESNS compared to the previous SNS are described hereinafter.

Non-Linearity Due to Rolling

The ESNS, in the calculation procedures of ship motions and global stresses on the hull girder (VBM and VSF), takes into account the non-linearity due to lateral motions coupled with rolling, providing more accurate and realistic results. At the same time, the combination of wave and slamming contributions is differentiated according to the condition of hogging or sagging in which the ship is.

Local Strain Calculation

While the SNS is dedicated to the current and estimated calculation of only the stresses related to the hull girder (motions, accelerations, VBM, VSF), the ESNS also includes a routine for the current and estimated calculation of expected/predicted local stresses, in terms of deformation of structural details.

The aim is to replace some of the local strain gauges currently present in the monitoring systems with virtual strain gauges and to add other check points of the condition of the structure without making the system more invasive.

The calculation takes place starting from the global loads previously calculated (VBM and VSF) and combined into the respective whipping and wave components and from response operators of the local stresses suitably calculated offline and implemented within the software like the RAO of global stresses.

The RAO of local stresses are determined by calculations on finite element models of the structure in question, loaded with global stresses of increasing value, in which the "mesh" of the area surrounding the point on which the local response is to be calculated is adequately thickened (detailed stress analysis).

It is generally necessary to perform the calculation with various values and combinations of global stresses to obtain global/local matching tables and interpolate between them in order to know the local stress value corresponding to the global stress calculated within the SNS module. It is not considered sufficient to run this calculation only for the unified global stresses and then scale the results obtained for local stresses, since geometrical non-linearity and discontinuities related to the local structures can make the matching between global and local stresses non-linear.

Local strains can therefore be calculated only for the wave stress contribution in hogging and sagging and for the total wave stress and slamming contribution, as calculated by the SNS module. The local strain share due only to the slamming contribution may therefore be determined as the difference between the previous two ones: its calculation through direct scaling of the local RAO for the slamming contribution to global stresses could lead to errors due to possible non-linearity in the transfer function between global stresses and global stresses.

Calculation of Fatigue Cycles for Local and Global Strains

The SNS module allows an estimate of the number and amplitude of the fatigue cycles undergone by the structural details monitored through virtual sensors.

The estimate may be made starting from the local strain share due only to the slamming contribution expected during the exposure time on the structural detail considered.

Implementing this feature is considered challenging both from the engineering point of view (definition of reliable calculation algorithms) and in terms of implementation.

For a slamming event that involves a known extent stress, the number and amplitude of the load cycles can be calculated considering the detail subject to a vibration of decreasing amplitude over time according to a damping and of frequency corresponding to the vibration mode of the structure part considered. The damping value can be determined from the literature, while the natural frequency is calculated using the same FEM model used to determine the RAO of local stresses.

Knowing the initial vibration amplitude (i.e. the local strain due only to the slamming contribution), damping and frequency, the software can calculate the number of cycles (and the amplitude for each of them) needed to reach the threshold below which the stress is deemed not to affect the fatigue life of the structure, the latter value being determined according to the type of material and structural detail.

The number of slamming events expected over the exposure time considered is difficult to determine.

It can be estimated in advance on the basis of the probability of occurrence of a slamming event in the speed and sea conditions considered: such probability is proportional to the number of times the vertical speed of the ship bow exceeds the relative critical vertical slamming speed, but since slamming is a stochastic phenomenon, the proportionality cannot be directly determined. However, it can be estimated with a sufficient degree of reliability if sufficient information and data from gauged real or tank seakeeping tests is available for the ship—or for the type of ship—considered: in this case, tables could be created implemented within the SNS module for determining the number of events per unit of time.

Alternatively, the number of slamming events directly detected during navigation by the HMS module may be referred to, if the latter is provided with this feature. The previous HMS module was not provided with it and this adjustment involves significant changes both at a hardware and at a software level.

Number and amplitude of fatigue cycles thus calculated are then saved in rainflow files similar to what is done in the case of real sensors, in this case by updating these files at intervals corresponding to the exposure time $T_{exp}$ set for the SNS module.

Correction of Data Estimated by SNS Using Values from Physical Sensors

According to the invention, the values measured by the HMS module by the sensors physically on board (long base strain gauge, strain gauges, accelerometers) are used to correct in real time—if necessary—the calculation made by the SNS module.

Implementing this feature involves a feedback loop on calculations made by the SNS module, and requires determining which real sensors are to be used to correct the single virtual sensors as reliably as possible.

With respect to the global stresses, the reference sensors are generally long strain gauge installed at the ship centerline as regards the calculated values of the bending moment in the other sections; accelerometers and inclinometers positioned close to the center of gravity as regards the ship motions.

With respect to the local stresses, the reference sensors must be identified in the design and customization step of the ESNS including, if necessary, the installation of one or more strain gauge sensors in locations agreed upon with the customer and well known by the designers who deal with numerical computation. During the execution of the structural calculations (whose final output is the RAO that is queried by the SNS module for calculating stresses on the basis of the state of the sea and the ship), the designer must calculate the RAO also in the reference positions so that the SNS module can use it as a point of comparison for the virtual sensors.

Figure 12B:
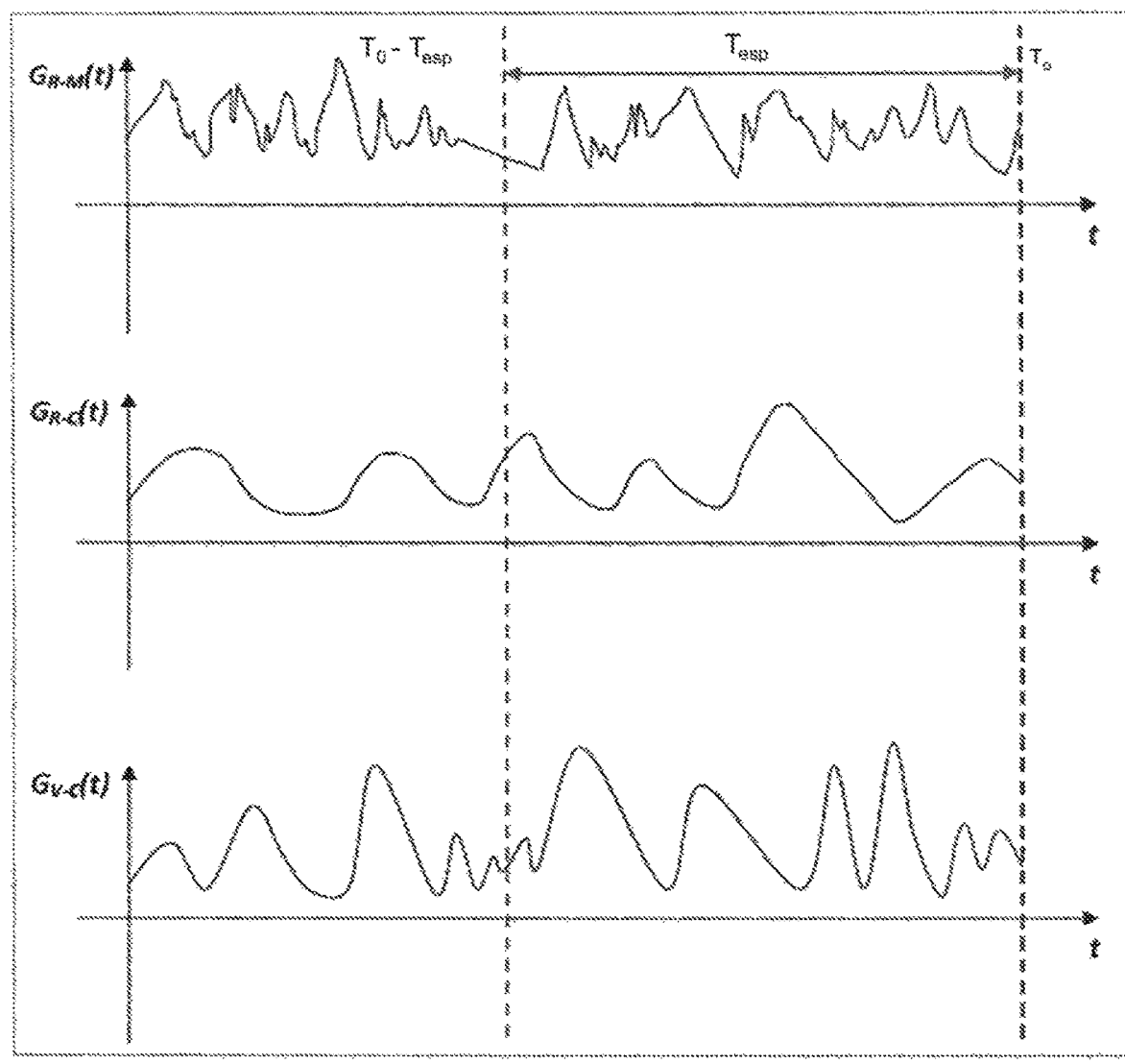
FIG. 12b shows temporal graphs of magnitudes considered in a correction procedure.

Once the system has been installed on board and configured, the correction procedure is as follows (FIG. 12b):

1. the HMS module detects the magnitude measured by the reference sensor $G_{R-M}(t)$ and provides it to the SNS module in terms of maximum, minimum, average and RMS (root mean square) value on the duration of the exposure time set in the SNS module;

2. the SNS module, receiving the speed, route and sea state data, calculates through the RAO, for each instant in which the HMS module measures the values acquired by the physical sensors, the expected minimum and maximum value on the exposure time of the same magnitude both in the reference point $G_{R-C}(t)$, and in the virtual sensor points, $G_{V-C}(t)$;

3. from such time stories consisting of the calculated maximums and minimums expected, the ESNS system extracts the maximum, minimum, average and RMS value;

4. ESNS compares the maximum, minimum, average and RMS value of the real data with that calculated on the same reference point and corrects according to the same offset percentage the data calculated by the SNS module in all the virtual sensors referred to that reference point.

Figure 13:
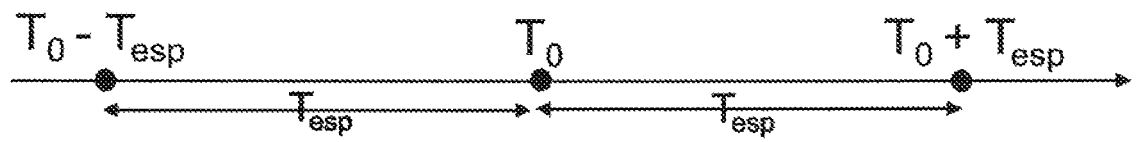
FIG. 13 shows a temporal axis as a reference for a correction procedure.

FIG. 13 represents the time axis, in which the point $T_0$ represents a reference instant in which the correction procedure takes place. The correction step is actually applied continuously in real time during the operation of the ESNS system; the calculated values are then constantly corrected according to what is calculated and measured at the reference points, allowing a continuous real-time calibration of the system for any navigation and environmental conditions in which the ship operates. $T_{exp}$ represents the exposure time with respect to which the estimates of the magnitudes are conventionally made by the SNS module. The time interval $(T_0, T_0+T_{exp})$ represents the time interval within which the magnitudes are expected to take the expected value estimated by the SNS module. Conversely, the correction procedure goes "back in time", referring to a time interval $(T_0-T_{exp}, T_0)$ preceding instant $T_0$. Therefore, an estimate of the magnitude of interest $G_{V-C}(t)$ is calculated at the point of interest without sensors (the point in question therefore is a "virtual sensor"), calculating an expected maximum value and a minimum value of the magnitude of interest in such a virtual sensor point, for each instant in the range of the exposure time $(T_0-T_{exp}, T_0)$ preceding the reference instant $T_0$. Moreover, for each instant included in the same time interval, an estimate of the magnitude of interest $G_{R-C}(t)$ is calculated at the reference sensor, calculating an expected maximum value and a minimum value of the magnitude of interest in the point of the reference sensor, for each instant in the range of the exposure time $(T_0-T_{exp}, T_0)$ preceding the reference instant $T_0$. In order to obtain an indication of magnitude to be compared with the estimate of magnitude at the point of the reference sensor, a maximum, minimum, average and RMS measurement value is extracted from recorded measurement data $G_{R-M}(t)$ provided by the reference sensor in the range of the exposure time $(T_0-T_{exp}, T_0)$ preceding instant $T_0$. The maximum, minimum, average and RMS value of the temporal history of the magnitude indication provided by the reference sensor is then compared with the estimate of the magnitude of interest in the point of the reference sensor; from this comparison, the offset value to be applied to the results of the calculation of magnitudes in the point of the virtual sensor is determined as the difference between the maximum, minimum, average and RMS measurement value and the expected maximum, minimum, average and RMS value of said magnitude in the point of the sensor.

According to a particularly simple embodiment, a correction is directly applied in the virtual point of the estimated value of the magnitude of interest, defined as the ratio between the offset value and the value of the magnitude of interest in the reference sensor point. According to embodiments of the invention, an offset value calculated for a reference sensor is used for the correction of the estimates in most virtual points. According to other embodiments, multiple offset values calculated for several reference sensors can be combined, for example added in a linear combination, and used for the corrections of the estimates in one or more virtual points.

Operating Envelope Diagrams

With respect to the previous SNS, which allowed plotting the polar diagrams of only the main stresses of the hull girder, the ESNS can also provide the display of Operating Envelope Diagrams customized for the specific ship and on the customer's request, as described above.

These diagrams require the definition of features which appropriately combine the results obtained in terms of motions and stresses, on the basis of the single case: the ESNS must therefore provide for the implementation of a certain number of the O.E.D., configurable based on the customer's specifications and on the operating limits of the single ship.

The interconnection problems related to the HMS-SNS integration will now be described.

Sharing Data from External Devices

The HMS system is already set up for the acquisition of the onboard signals (GPS, gyro, etc.) and it is necessary that these data are sent to the SNS module for evaluating the stresses as a function of the speed and route, in addition to an input coming from the sea state measurement system.

It should also be considered that the computer of the sea state measurement system is separate from the ESNS system. In the previous HMS, the system receives the information on significant wave height, average zero crossing period, prevailing wave direction and more via a serial NMEA string agreed with the manufacturer of the sub-product.

The software of the previous SNS system is installed on the same computer on which the wave height measurement system runs and the exchange of the information required is carried out by reading a text file saved to a common folder. This mode, in addition to reducing the life time of the disk due to frequent accesses to the same, slows the program execution that does not have direct access to this information in the memory.

As regards the ESNS, since the software for determining the state of the sea is manufactured by a third-party developer and resides on a computer separated from that of the ESNS, the best solution is to abandon reading the file and use the NMEA sentences via serial connection to transfer the necessary information.

The use of the information from external devices by the two modules (HMS and SNS) of the ESNS system via serial connections should in any case take into account the timing issues that arise when two different systems are to access the information contained in the data flow from the same serial connection at the same time.

Virtual Sensor Integration in the HMS Module

The SNS module is used to obtain information about stresses (strains or accelerations) even in points not covered by the sensors.

This information must be displayed on screen and treated like a sensor really existing on board. A sort of virtual sensor is thus created whose value is not provided by a transducer placed on board but is the result of a numerical calculation.

The HMS system provides the ability to monitor up to 48 channels, be they strain gauges (long base strain gauges for global strains or short base strain gauges for local strains) or analog (accelerometers, inclinometers, pressure probes, . . . ). The introduction of virtual channels involves two different intervention levels: that of channel configuration and that of data access.

The HMS software currently provides for the configuration of each of the 48 channels independently, allowing to choose between several different types of sensors. Adding a virtual sensor, considered a new "type" of sensor, thus implies the need to modify both the configuration interface and the architecture of the configuration file.

From this addition follows the need to modify the entire management mode of both the signals and the alarms, as regards the virtual sensors.

The most critical ones are the following:

The virtual sensors can be acquired simultaneously or not simultaneously as the real sensors. The latter have a well-defined sampling rate (depending on the Registry requirements) and their statistical data are sent to the MPU at least every second.

The refresh rate of the virtual sensor value, on the other hand, is directly dependent on the response of the RAO, depending in turn both on the waiting latency time of the data related to the sea state and on the exposure time set in the SNS. It follows that—according to the settings of the ESNS module—the output times of the output values from the RAO may or may not be comparable to those from the field data, with consequent timing problems both in the display and in the management of alarms which are properly managed by the software.

While in the case of real sensors, the HMS receives a temporal history on which it calculates statistical data (max, min, average, standard deviation), in the case of virtual sensors it only receives maximum, minimum, average and RMS values relating to the expected hogging and sagging conditions for the exposure time considered.

One of the main functions of the HMS is the verification of the correct sensor operation and of the calculation of statistical values of the measured magnitudes. Checking the quality of the sensor takes place mainly by monitoring the average value and the standard deviation of the values acquired. In a sensor not working, there is no variation to the above values and therefore, after a certain number of cycles, a sensor with constant average and null standard deviation is referred to as not working (G. Cusano, M. Garbarino, 'Sh.A.M.An. (SHip Advanced Monitoring and ANalysis) system: principles and algorithm used for data processing', CETENA Report no. 11222, Genova, Mar. 16, 2012).

Inserting a virtual sensor directly within the HMS module that manages alarms would undoubtedly lead to reporting false errors due to the calculation delays with respect to the data reception speed from the field and of the constant value indicated by the virtual sensor on a defined time interval: the alarm management part should therefore be reviewed implementing a specification thereof for virtual sensors.

A possible lack or invalidity of the data related to the sea state (due to failure of the radar or of the measuring system, or data communication failure) would make it impossible for the SNS module to calculate the ship response and therefore the stresses at the virtual sensors, which would thus be deemed as not working. It is therefore suitable to evaluate data protection methodologies (e.g. sample & hold up to receiving the new value) and an appropriate alarm management: a lack of data related to the measurement of the state of the sea is to be compared to the "breaking" of the virtual sensor.

ESNS System Interface

The main interface of the ESNS system basically reflects the HMS system interface, which displays both the data from the real sensors and those calculated by the virtual sensors: data and related alarms will be managed as explained above and the user, in principle, has no need to differentiate between real and virtual sensors. Virtual sensors are in any case identified, for example with labels of different color than the real ones or in an alternative manner.

Also the screen dedicated to the system mimics is the same as that of the HMS, in which the positions of the real sensors are added to those of the virtual sensors, appropriately indicated.

Compared to the current HMS, an extra window is added, which can be retrieved by the user, which displays the part relating to the predictive function ex-SNS. A graphical interface similar to that of the previous SNS displays the polar diagrams of the expected/predicted values of the virtual sensors for the current and/or predicted or attempt navigation and sea conditions.

Moreover, in such conditions it displays the "Operating Envelope Diagrams" specifically implemented for the single ship upon the customer's request.

An embodiment of a system for assisting the driving of a ship according to the invention has been described. It is understood that the invention is not limited to such an embodiment but may be varied within the scope defined by the appended claims.

The invention claimed is:

1. A system for assisting the driving of a ship, comprising:
a navigation detector adapted to provide an indication of motion of the ship;
an environmental detector adapted to provide an indication of sea wave motion; and
at least one processing unit, configured to execute in real time, during the motion of the ship, the following steps:
determining rigid body ship motions due to direct wave excitation based on the indication of the ship motion and on the indication of the sea wave motion,
estimating structural loads of the ship due to the direct wave excitation, said estimation being calculated on the basis of said determination of the rigid body ship motions,
evaluating and providing an indication of wave slamming on the ship,
estimating the structural loads of the ship due to the whipping effect caused by the wave slamming, said estimate being calculated on the basis of said indication of wave slamming on the ship, wherein said estimates of structural loads are based on 3D finite element models, which reproduce dynamic behaviors of the ship structure,
calculating a combination of the estimated structural loads, and
graphically and/or numerically presenting the combination of the estimated structural loads;
at least one reference sensor adapted to provide an indication of a motion or stress magnitude at a predetermined point of the ship structure,
said at least one processing unit being further configured to execute in real time, during the motion of the ship, the following steps:
calculating an estimate of said magnitude at the predetermined point of the ship structure, said calculation including:
calculating a first estimate contribution due to the direct wave excitation, said first estimate contribution being calculated on the basis of said determination of the rigid body ship motions,
calculating a second estimate contribution due to the whipping effect caused by the wave slamming, said second estimate contribution being calculated on the basis of said indication of wave slamming on the ship, wherein said estimate contributions are based on 3D finite element models, which reproduce dynamic behaviors of an area of the ship structure at said predetermined point,
calculating a combination of said first and second estimate contribution,
comparing said indication of magnitude, provided by the reference sensor during the motion of the ship, with the estimate of said magnitude to determine an offset value; and
correcting the estimates of the structural loads and/or the estimate of said magnitude on the basis of said offset value.

2. A system according to claim 1, wherein estimating structural loads of the ship due to the whipping effect caused by the wave slamming includes estimating phasing between a whipping component and a wave slamming component.

3. A system according to claim 1, wherein said at least one processing unit is further configured to execute in real time, during the motion of the ship, the following steps:
calculating an estimate of said magnitude at at least one second, sensorless predetermined point of the ship structure, said calculation including:
calculating a first estimate contribution due to the direct wave excitation, said first estimate contribution being calculated on the basis of said determination of the rigid body ship motions,
calculating a second estimate contribution due to the whipping effect caused by the wave slamming, said second estimate contribution being calculated on the basis of said indication of wave slamming on the ship, wherein said estimate contributions are based on 3D finite element models, which reproduce dynamic behaviors of an area of the ship structure at said second predetermined point,
calculating a combination of said first and second estimate contribution;
graphically and/or numerically presenting the combination of said first and second estimate contribution.

4. A system according to claim 3, wherein said at least one processing unit is further configured to execute in real time, during the motion of the ship, the following steps:
correcting the estimate of said magnitude at the second, sensorless predetermined point based on the offset value determined by the comparison between said indication of magnitude provided by the reference sensor during the ship motion, with the estimate of said magnitude calculated at the first predetermined point provided with the reference sensor.

5. A system according to claim 4, wherein
said step of calculating an estimate of said magnitude at the second, sensorless predetermined point includes:
calculating an expected maximum value and minimum value of said magnitude of the second predetermined point at each acquisition instant within an exposure time interval before a reference instant, and
calculating, at the reference instant, the maximum, minimum, average and RMS value of the expected maximum values and minimum values in the exposure time interval for the second predetermined point;

said step of calculating an estimate of said magnitude at the first predetermined point provided with reference sensor includes calculating an expected maximum value and minimum value of said magnitude of the first predetermined point at each acquisition instant within the exposure time interval before the reference instant, and calculating, at the reference instant, the maximum, minimum, average and RMS value of the expected maximum values and minimum values in the exposure time interval for the first predetermined point;

said step of comparing said indication of magnitude with the estimate of said magnitude includes:

extracting a maximum, minimum, average and RMS measurement value from recorded data of measurements provided by the reference sensor in the exposure time interval, and determining offset values as the difference between the maximum, minimum, average and RMS measurement value and the expected maximum, minimum, average and RMS value of said magnitude in the first predetermined point in the time interval.

6. A system according to claim 5, wherein said step of correcting the estimate of said magnitude at the second, sensorless predetermined point includes:

correcting the expected maximum, minimum, average and RMS value of said magnitude in the second predetermined point on the basis of said offset values.

* * * * *

UNITED STATES PATENT AND TRADEMARK OFFICE
CERTIFICATE OF CORRECTION

Page 1 of 1

PATENT NO. : 10,501,152 B2
APPLICATION NO. : 15/540503
DATED : December 10, 2019
INVENTOR(S) : Giovanni Cusano et al.

It is certified that error appears in the above-identified patent and that said Letters Patent is hereby corrected as shown below:

On the Title Page

(30) Foreign Application Priority Data: "Dec. 30, 2014 (IT) MI2014A2277" should read
--Dec. 30, 2014 (IT) MI2014A002277--

Signed and Sealed this
Tenth Day of March, 2020

Andrei Iancu
*Director of the United States Patent and Trademark Office*